US011902998B2

(12) United States Patent
Hosseini et al.

(10) Patent No.: US 11,902,998 B2
(45) Date of Patent: *Feb. 13, 2024

(54) PRIORITY INDICATION FOR DOWNLINK PREEMPTION AND UPLINK CANCELLATION

(71) Applicant: QUALCOMM Incorporated, San Diego, CA (US)

(72) Inventors: Seyedkianoush Hosseini, San Diego, CA (US); Wei Yang, San Diego, CA (US); Peter Gaal, San Diego, CA (US); Wanshi Chen, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,329

(22) Filed: Mar. 3, 2023

(65) Prior Publication Data

US 2023/0209566 A1    Jun. 29, 2023

Related U.S. Application Data

(63) Continuation of application No. 17/173,580, filed on Feb. 11, 2021, now Pat. No. 11,627,595.

(Continued)

(51) Int. Cl.
*H04W 56/00* (2009.01)
*H04W 72/23* (2023.01)
(Continued)

(52) U.S. Cl.
CPC ....... *H04W 72/23* (2023.01); *H04W 72/0446* (2013.01); *H04W 72/0453* (2013.01);
(Continued)

(58) Field of Classification Search
CPC . H04W 72/23; H04W 72/56; H04W 72/0446; H04W 72/0453; H04W 74/006; H04W 74/04
(Continued)

(56) References Cited

U.S. PATENT DOCUMENTS

2019/0306848 A1* 10/2019 Zhou ............... H04W 72/044
2021/0219276 A1* 7/2021 Liu ................. H04L 5/0007
(Continued)

OTHER PUBLICATIONS

Interdigital Inc: "Enhanced Inter UE Transmit Prioritization/Multiplexing for eURLLC", 3GPP Draft, 3GPP TSG RAN WG1 #98, R1-1909453, Enhanced Inter UE TX Prioritization Multiplexing, 3rd Generation Partnership Project (3GPP), Mobile Competence Centre, 650. Route Des Lucioles, F-06921 Sophia-Antipolis Cedex, vol. RAN WG1. No. Prague, Czech, Aug. 26, 2019-Aug. 30, 2019, Aug. 16, 2019, XP051766059, 8 Pages, Sections 1-3, the whole document, p. 4, line 7-line 14, Proposal 5, p. 4.

(Continued)

*Primary Examiner* — Sai Ming Chan
(74) *Attorney, Agent, or Firm* — Holland & Hart LLP

(57) ABSTRACT

Methods, systems, and devices for wireless communications are described. The methods, systems, and devices may enable a base station to determine an operation state for a user equipment (UE) that corresponds to how the UE applies a preemption indication. The base station may indicate the operation state to the UE using a parameter of a configuration message. The base station may transmit a grant indicating time-frequency resources scheduled for the UE. The UE may identify a priority of a channel associated with the scheduled resources. The base station may determine a number of scheduled resources to be preempted or canceled and may indicate these resources to the UE using a preemption indication. The UE may determine remaining time- (Continued)

frequency resources based on the preemption indication, the priority of the channels, the operation state, or a combination thereof.

44 Claims, 18 Drawing Sheets

Related U.S. Application Data

(60) Provisional application No. 62/977,037, filed on Feb. 14, 2020.

(51) Int. Cl.
   *H04W 74/00* (2009.01)
   *H04W 72/0446* (2023.01)
   *H04W 72/0453* (2023.01)
   *H04W 74/04* (2009.01)
   *H04W 72/56* (2023.01)

(52) U.S. Cl.
   CPC ......... *H04W 72/56* (2023.01); *H04W 74/006* (2013.01); *H04W 74/04* (2013.01)

(58) Field of Classification Search
   USPC .......................................................... 370/330
   See application file for complete search history.

(56) References Cited

U.S. PATENT DOCUMENTS

2021/0227508 A1* 7/2021 Lee ..................... H04W 74/006
2021/0259002 A1   8/2021 Hosseini et al.

OTHER PUBLICATIONS

International Search Report and Written Opinion—PCT/US2021/018046—ISA/EPO—dated May 31, 2021.
Nokia, et al., "UL Inter-UE eMBB and URLLC Multiplexing Enhancements", 3GPP TSG RAN WG1 Meeting #98-Bis, R1-1910868 NR_URLLC_INTER_UE_MUX_CHONGQING_FINAL, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, Oct. 7, 2019 (Oct. 7, 2019), 16 Pages, XP051808982, pp. 2-8,2 Refinement of uplink cancelation solution, p. 8, line 25-line 40, Section 2.3.
Qualcomm Incorporated: "Uplink Inter-UE Tx Multiplexing and Prioritization", 3GPP Draft, 3GPP TSG-RAN WG1 #98, R1-1909268, Uplink inter-UE Tx Multiplexing and Prioritization, 3rd Generation Partnership Project (3GPP), Mobile Competence Centre, 650, Route Des Lucioles, F-06921 Sophia-Antipolis CE, vol. RAN WG1, No. Prague, Czech Republic, Aug. 26, 2019-Aug. 30, 2019, Aug. 17, 2019 (Aug. 17, 2019), XP051765873, 10 Pages, Section 2.2, paragraph 3, The whole document.
ZTE: "UL Inter-UE Multiplexing Between eMBB and URLLC", 3GPP Draft, 3GPP TSG RAN WG1 #99, R1-1911967, 3rd Generation Partnership Project (3GPP), Mobile Competence Centre; 650, Route Des Lucioles; F-06921, Sophia-Antipolis Cedex; France, vol. RAN WG1, No. Reno, USA, Nov. 18, 2019-Nov. 22, 2019, Nov. 9, 2019 (Nov. 9, 2019), XP051823148, 9 pages, pp. 2-7, 2 Details of UL cancelation mechanism.

* cited by examiner

PRIORITY INDICATION FOR DOWNLINK PREEMPTION AND UPLINK CANCELLATION

CROSS REFERENCE

The present Application for Patent is a continuation of U.S. patent application Ser. No. 17/173,580 by HOSSEINI et al., entitled "PRIORITY INDICATION FOR DOWNLINK PREEMPTION AND UPLINK CANCELLATION," filed Feb. 11, 2021, which claims the benefit of U.S. Provisional Patent Application No. 62/977,037 by HOSSEINI et al., entitled "PRIORITY INDICATION FOR DOWNLINK PREEMPTION AND UPLINK CANCELLATION," filed Feb. 14, 2020, each of which is assigned to the assignee hereof, and each of which is expressly incorporated by reference in its entirety herein.

FIELD OF TECHNOLOGY

The following relates generally to wireless communications and more specifically to priority indication for downlink preemption and uplink cancellation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support priority indication for downlink preemption and uplink cancellation. Generally, the described techniques enable a base station to determine an operation state for a user equipment (UE) that may correspond to how the UE applies a preemption indication (e.g., a downlink preemption indication (DLPI) or an uplink cancellation indication (ULCI)). The base station may indicate the operation state to the UE using a parameter of a configuration message, within an information element of a configuration message, via control signaling, or the like. Further, the base station may transmit a grant indicating time-frequency resources scheduled for a channel for the UE, and the UE may identify the priority of the channel associated with the scheduled time-frequency resources. The base station may determine a number of scheduled resources to be preempted or canceled, and may indicate these resources to the UE using a preemption indication. The UE may determine remaining time-frequency resources based on the preemption indication, the priority of the channels, and the operation state, and may communicate with the base station using the remaining time-frequency resources.

A method of wireless communications at a UE is described. The method may include receiving, from a base station, a configuration message including a parameter that indicates an operation state by the UE to apply a preemption indication based on a priority of a channel associated with the preemption indication, identifying the priority of the channel and time-frequency resources scheduled for the channel, receiving an instance of the preemption indication, determining, based on the received instance of the preemption indication and the identified priority of the channel, a remaining portion of the identified time-frequency resources, and communicating with the base station using the remaining portion of the time-frequency resources.

An apparatus for wireless communications at a UE is described. The apparatus may include a processor, a memory coupled with the processor, and instructions stored in the memory. The instructions may be executable by the processor to cause the apparatus to receive, from a base station, a configuration message including a parameter that indicates an operation state by the UE to apply a preemption indication based on a priority of a channel associated with the preemption indication, identify the priority of the channel and time-frequency resources scheduled for the channel, receive an instance of the preemption indication, determine, based on the received instance of the preemption indication and the identified priority of the channel, a remaining portion of the identified time-frequency resources, and communicate with the base station using the remaining portion of the time-frequency resources.

Another apparatus for wireless communications at a UE is described. The apparatus may include means for receiving, from a base station, a configuration message including a parameter that indicates an operation state by the UE to apply a preemption indication based on a priority of a channel associated with the preemption indication, identifying the priority of the channel and time-frequency resources scheduled for the channel, receiving an instance of the preemption indication, determining, based on the received instance of the preemption indication and the identified priority of the channel, a remaining portion of the identified time-frequency resources, and communicating with the base station using the remaining portion of the time-frequency resources.

A non-transitory computer-readable medium storing code for wireless communications at a UE is described. The code may include instructions executable by a processor to receive, from a base station, a configuration message including a parameter that indicates an operation state by the UE to apply a preemption indication based on a priority of a channel associated with the preemption indication, identify the priority of the channel and time-frequency resources scheduled for the channel, receive an instance of the preemption indication, determine, based on the received instance of the preemption indication and the identified priority of the channel, a remaining portion of the identified time-frequency resources, and communicate with the base station using the remaining portion of the time-frequency resources.

In some examples of the method, apparatuses, and non-transitory computer-readable medium described herein, the preemption indication includes a DLPI.

Some examples of the method, apparatuses, and non-transitory computer-readable medium described herein may further include operations, features, means, or instructions for determining a set of time-frequency resources of the identified time-frequency resources scheduled for the channel, the set of time-frequency resources non-overlapping with the remaining portion of the time-frequency resources, and refraining from monitoring the set of time-frequency resources based on the DLPI.

Some examples of the method, apparatuses, and non-transitory computer-readable medium described herein may further include operations, features, means, or instructions for determining a set of time-frequency resources scheduled for a second channel associated with a second priority different from the priority of the channel, the set of time-frequency resources non-overlapping with the remaining portion of the time-frequency resources, and monitoring the set of time-frequency resources for the second channel based on the operation state and the DLPI being associated with the priority.

In some examples of the method, apparatuses, and non-transitory computer-readable medium described herein, the second channel may be associated with a carrier different than the channel.

Some examples of the method, apparatuses, and non-transitory computer-readable medium described herein may further include operations, features, means, or instructions for receiving a message indicating a set of time-frequency resources for the DLPI, and monitoring the set of time-frequency resources for the DLPI, where receiving the instance of the preemption indication may be based on the monitoring.

In some examples of the method, apparatuses, and non-transitory computer-readable medium described herein, the preemption indication includes an ULCI.

Some examples of the method, apparatuses, and non-transitory computer-readable medium described herein may further include operations, features, means, or instructions for determining a set of time-frequency resources of the identified time-frequency resources scheduled for the channel, the set of time-frequency resources non-overlapping with the remaining portion of the time-frequency resources, and refraining from transmitting an uplink message using the set of time-frequency resources based on the ULCI.

Some examples of the method, apparatuses, and non-transitory computer-readable medium described herein may further include operations, features, means, or instructions for determining a set of time-frequency resources scheduled for a second channel associated with a second priority different from the priority of the channel, the set of time-frequency resources non-overlapping with the remaining portion of the time-frequency resources, and transmitting the second channel using the set of time-frequency resources based on the operation state and the ULCI being associated with the priority.

In some examples of the method, apparatuses, and non-transitory computer-readable medium described herein, the second channel may be associated with a carrier different than the channel.

Some examples of the method, apparatuses, and non-transitory computer-readable medium described herein may further include operations, features, means, or instructions for receiving a message indicating a set of time-frequency resources for the ULCI, and monitoring the set of time-frequency resources for the ULCI, where receiving the instance of the preemption indication may be based on the monitoring.

Some examples of the method, apparatuses, and non-transitory computer-readable medium described herein may further include operations, features, means, or instructions for configuring the UE to monitor for both a DLPI and an ULCI.

In some examples of the method, apparatuses, and non-transitory computer-readable medium described herein, configuring the UE to monitor for both the DLPI and the ULCI may include operations, features, means, or instructions for receiving a first message configuring the UE to monitor for the DLPI, and receiving a second message configuring the UE to monitor for the ULCI.

Some examples of the method, apparatuses, and non-transitory computer-readable medium described herein may further include operations, features, means, or instructions for determining a set of channels including the channel in which the UE may be to apply the preemption indication based on the operation state.

In some examples of the method, apparatuses, and non-transitory computer-readable medium described herein, the set of channels includes at least two channels with different priorities.

A method of wireless communications at a base station is described. The method may include determining an operation state for a UE to apply a preemption indication based on a priority of a channel associated with the preemption indication, transmitting, to the UE, a configuration message including a parameter that indicates the operation state, transmitting, to the UE, a grant indicating time-frequency resources scheduled for the channel, transmitting an instance of the preemption indication, determining, based on the instance of the preemption indication and the priority of the channel, a remaining portion of the identified time-frequency resources, and communicating with the UE using the remaining portion of the time-frequency resources.

An apparatus for wireless communications at a base station is described. The apparatus may include a processor, a memory coupled with the processor, and instructions stored in the memory. The instructions may be executable by the processor to cause the apparatus to determine an operation state for a UE to apply a preemption indication based on a priority of a channel associated with the preemption indication, transmit, to the UE, a configuration message including a parameter that indicates the operation state, transmit, to the UE, a grant indicating time-frequency resources scheduled for the channel, transmit an instance of the preemption indication, determine, based on the instance of the preemption indication and the priority of the channel, a remaining portion of the identified time-frequency resources, and communicate with the UE using the remaining portion of the time-frequency resources.

Another apparatus for wireless communications at a base station is described. The apparatus may include means for determining an operation state for a UE to apply a preemption indication based on a priority of a channel associated with the preemption indication, transmitting, to the UE, a configuration message including a parameter that indicates the operation state, transmitting, to the UE, a grant indicating time-frequency resources scheduled for the channel, transmitting an instance of the preemption indication, determining, based on the instance of the preemption indication and the priority of the channel, a remaining portion of the identified time-frequency resources, and communicating with the UE using the remaining portion of the time-frequency resources.

A non-transitory computer-readable medium storing code for wireless communications at a base station is described.

The code may include instructions executable by a processor to determine an operation state for a UE to apply a preemption indication based on a priority of a channel associated with the preemption indication, transmit, to the UE, a configuration message including a parameter that indicates the operation state, transmit, to the UE, a grant indicating time-frequency resources scheduled for the channel, transmit an instance of the preemption indication, determine, based on the instance of the preemption indication and the priority of the channel, a remaining portion of the identified time-frequency resources, and communicate with the UE using the remaining portion of the time-frequency resources.

In some examples of the method, apparatuses, and non-transitory computer-readable medium described herein, the preemption indication includes a DLPI.

Some examples of the method, apparatuses, and non-transitory computer-readable medium described herein may further include operations, features, means, or instructions for refraining from transmitting the channel using the time-frequency resources based on the DLPI.

Some examples of the method, apparatuses, and non-transitory computer-readable medium described herein may further include operations, features, means, or instructions for determining a set of time-frequency resources for a second channel associated with a second priority different from the priority of the channel, the set of time-frequency resources non-overlapping with the remaining portion of the time-frequency resources, and transmitting the second channel using the set of time-frequency resources based on the operation state and the DLPI being associated with the priority.

In some examples of the method, apparatuses, and non-transitory computer-readable medium described herein, the second channel may be associated with a carrier different than the channel.

Some examples of the method, apparatuses, and non-transitory computer-readable medium described herein may further include operations, features, means, or instructions for transmitting a message indicating a set of time-frequency resources for the DLPI, and transmitting the DLPI using the set of time-frequency resources.

In some examples of the method, apparatuses, and non-transitory computer-readable medium described herein, the preemption indication includes an ULCI.

Some examples of the method, apparatuses, and non-transitory computer-readable medium described herein may further include operations, features, means, or instructions for determining a set of time-frequency resources of the identified time-frequency resources scheduled for the channel, the set of time-frequency resources non-overlapping with the remaining portion of the time-frequency resources, and refraining from monitoring the set of time-frequency resources for an uplink message from the UE based on the ULCI.

Some examples of the method, apparatuses, and non-transitory computer-readable medium described herein may further include operations, features, means, or instructions for determining a set of time-frequency resources for a second channel associated with a second priority different from the priority of the channel, the set of time-frequency resources non-overlapping with the remaining portion of the time-frequency resources, and monitoring the set of time-frequency resources for the second channel based on the operation state and the ULCI being associated with the priority.

In some examples of the method, apparatuses, and non-transitory computer-readable medium described herein, the second channel may be associated with a carrier different than the channel.

Some examples of the method, apparatuses, and non-transitory computer-readable medium described herein may further include operations, features, means, or instructions for transmitting a message indicating a set of time-frequency resources for the ULCI, and transmitting the ULCI using the set of time-frequency resources.

Some examples of the method, apparatuses, and non-transitory computer-readable medium described herein may further include operations, features, means, or instructions for configuring the UE to monitor for both a DLPI and an ULCI.

In some examples of the method, apparatuses, and non-transitory computer-readable medium described herein, configuring the UE to monitor for both the DLPI and the ULCI may include operations, features, means, or instructions for transmitting a first message configuring the UE to monitor for the DLPI, and transmitting a second message configuring the UE to monitor for the ULCI.

DETAILED DESCRIPTION

Figure 1:
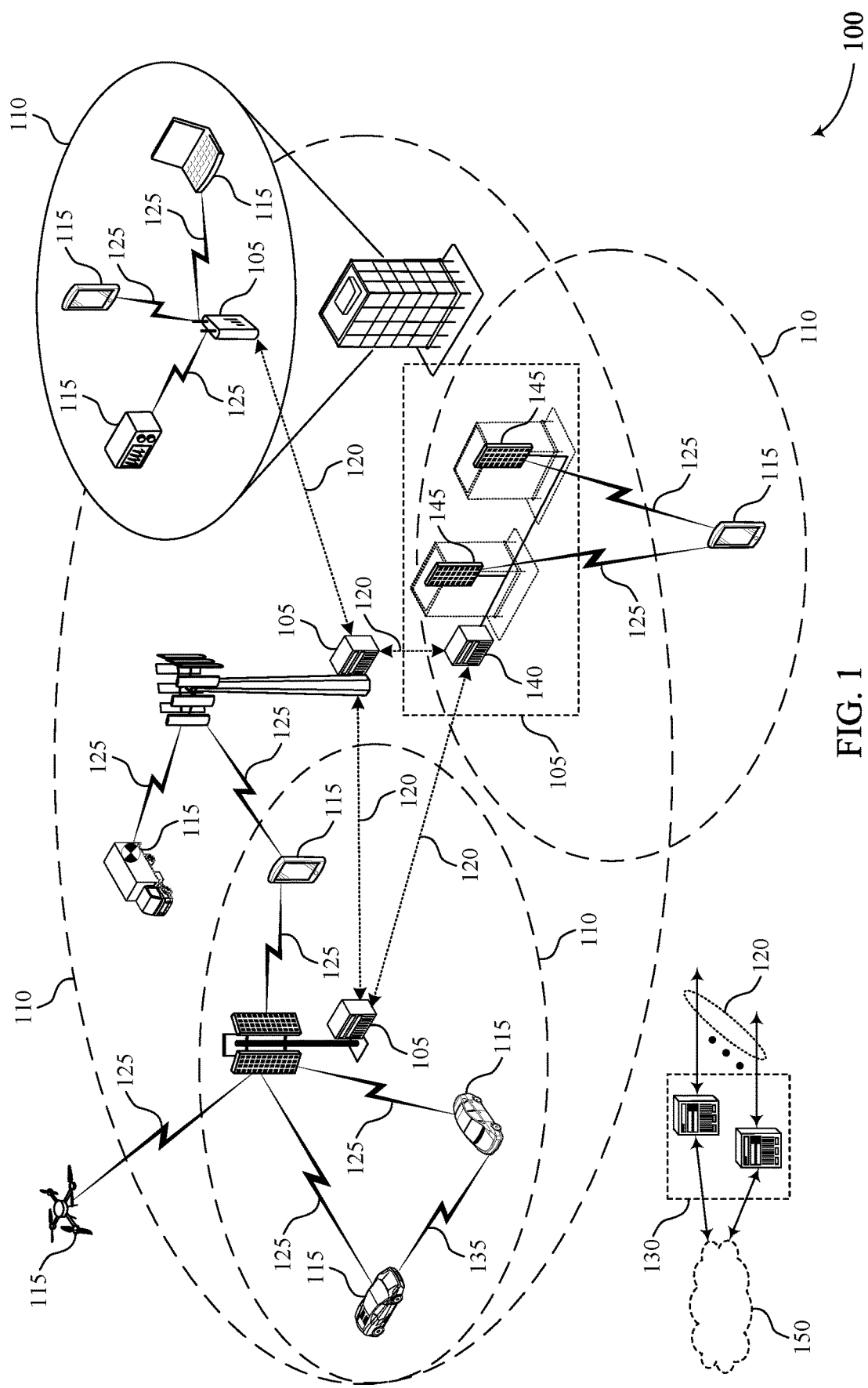
FIGS. 1 and 2 illustrate examples of wireless communications systems that support priority indication for downlink preemption and uplink cancellation in accordance with aspects of the present disclosure.

In some wireless communications systems, a base station may multiplex a transmission to a group of one or more UEs using pre-allocated time-frequency resources. In some cases, a first UE in the group may configured to communicate messages according to a given priority or may be associated with different message types or channel types as compared to a second UE in the group. For example, the first UE may transmit or receive ultra-reliable low latency communications (URLLC) messages while the second UE may transmit or receive enhanced mobile broadband (eMBB) messages. In some cases, the second UE may be scheduled to use a time-frequency resource that may also (e.g., at a later time) be scheduled for higher priority traffic. In such instances, the base station may transmit control information (e.g., downlink control information (DCI)) indicating time-frequency resources that may be preempted (e.g., in case of downlink) or canceled (e.g., in case of uplink) by the second UE.

The control information may be transmitted by the base station using a group common control channel (e.g., group common a physical downlink control channel (GC-PDCCH)). For example, the base station may use a sequence of bits in a DCI message, which may be referred to as a preemption indication (e.g., a downlink preemption indication (DLPI) or uplink cancellation indication (ULCI)), to indicate time-frequency resources that are to be preempted or canceled. If the first UE, the second UE, or both has a channel (e.g., a physical downlink shared channel (PDSCH), a physical uplink shared channel (PUSCH), or other signaling such as a sounding reference signal (SRS)) that is scheduled via resources that overlap with the resources indicated by the preemption indication, the UE may determine that the overlapping portions are to be preempted or canceled.

In some cases, an uplink channel or a downlink channel may be associated with a given a priority level. For example, a channel may have a high priority level (e.g., relative to one or more lower priority level channels) or a low priority level (e.g., relative to one or more higher priority level channels). In some other examples, channels may be associated with one of three or more different priorities (e.g., high, medium, or low priority, etc.). A UE may receive a preemption indication, and preempt or cancel the indicated resource regardless of operating conditions at the UE (e.g., regardless of whether the UE operates according to URLLC or eMBB criteria). That is, the UE may apply a preemption indication or cancellation indication to data regardless of priority or channel type. In some cases, cancelling or preempting channels without considering priority may cause unnecessary cancelation or preemption, which may result in latency and inefficiency in the system (e.g., due to the granularity of the preemption indication).

Accordingly, the techniques described herein may enable a base station to configure a behavior of a UE (e.g., semi-statically or dynamically) to apply a preemption indication or cancellation indication to a channel based on priority. For example, the base station may indicate an operation state in a configuration message to one or more UEs. The base station may indicate the operation state to the one or more UEs using a parameter in radio resource control (RRC) signaling, a system information block (SIB) transmission, or any other signaling. The operation state may correspond to or indicate how a UE is to apply a preemption indication or cancellation indication to a set of time-frequency resources scheduled for a channel based on the priority of the channel.

For example, in a first operation state, the UE may apply the preemption indication or cancellation indication to scheduled time-frequency resources regardless of the priority of the channel. In some cases, a UE operating in the first operation state may determine to preempt or cancel time-frequency resources scheduled for a high priority channel, such as an URLLC channel, or a low priority channel, such as an eMBB channel (e.g., regardless of the priority of the channel). The priority of a channel associated with a first UE may be relative to other channels associated with transmissions for other UEs. In some other examples, the base station may indicate a second operation state. In the second operation state, the UE may apply the preemption indication or cancellation indication to time-frequency resources of low priority channels (e.g., an eMBB channel), while maintaining communication scheduled in time-frequency resources for high priority channels (e.g., an URLLC channel).

In some cases, if the UE is configured to monitor for more than one preemption indication (e.g., both DLPI and ULCI), the base station may separately configure the parameter that indicates the operation state for DLPI and ULCI messages. In some other cases, the base station may jointly configure the parameter for DLPI and ULCI messages. Additionally or alternatively, the preemption indication may indicate resource preemption or cancellation on different carriers. In some examples, the base station may separately configure the parameter that indicates the operation state for the different carriers. In some other examples, the base station may jointly configure the parameter that indicates the operation state for the different carriers (e.g., by grouping the configuration of different carriers in a single message). In such cases, if a preemption indication indicates resources of a first carrier, the preemption indication may be applied to channels regardless of priority, while if the preemption indication indicates resources of a second carrier, some channels (e.g., the low priority channels or channels having a priority below a given priority threshold) may be preempted or canceled.

Aspects of the disclosure are initially described in the context of wireless communications systems. Additional aspects of the disclosure are described with reference to process flows. Aspects of the disclosure are further illustrated by and described with reference to apparatus diagrams, system diagrams, and flowcharts that relate to priority indication for downlink preemption and uplink cancellation.

FIG. 1 illustrates an example of a wireless communications system 100 that supports priority indication for downlink preemption and uplink cancellation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that may be operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection may be anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Additionally or alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), eMBB) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In some other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other cases, the device may provide HARQ feedback in a subsequent slot, or according to some other time interval.

Wireless communications system 100 may support configuration of a UE 115 by a base station 105. For example, a base station 105 may configure a UE 115 with an operation state related to a preemption indication (e.g., DLPI) or cancellation indication (e.g., ULCI, which may also be referred to as an uplink preemption indication (DLPI)). In a first operation state, the UE 115 may perform the preemption or cancellation of communications scheduled on time-frequency resources on a channel regardless of a priority of the channel. In a second operation state, the UE 115 may perform the preemption or cancellation of communications scheduled on time-frequency resources on a channel based on a priority of the channel. For example, the UE 115 may preempt or cancel communications scheduled via resources indicated by the preemption indication for a low priority channel relative to another channel or relative to a priority threshold. The UE 115 may communicate with the base station 105 using the remaining portion of the time-frequency resources (e.g., the time-frequency resources that have not been preempted or canceled). Thus, the UE 115 may avoid unnecessary preemptions or cancelations, which may improve efficiency and reduce latency in the wireless communications system 100.

Figure 2:
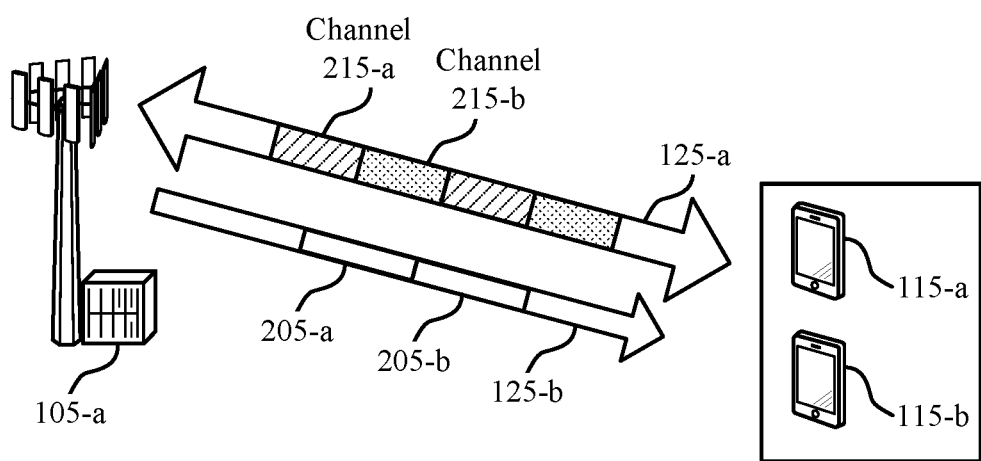

FIG. 2 illustrates an example of a wireless communications system 200 that supports priority indication for downlink preemption and uplink cancellation in accordance with aspects of the present disclosure. In some examples, wireless communications system 200 may implement aspects of wireless communications system 100 and may include UE 115-a, UE 115-b, base station 105-a, and communication link 125-a, which may be examples of UEs 115, a base station 105, and a communication link 125 described with reference to FIG. 1. As described herein, base station 105-a may configure one or more of UE 115-a and UE 115-b with a priority indication for downlink preemption and uplink cancellation to reduce signaling overhead associated with low granularity preemption indications (e.g., a DLPI or ULCI).

In some examples, a base station 105 may communicate with one or more UEs 115 via a communication link 125. For example, base station 105-a may communicate with UE 115-a and 115-b using a group common control channel (e.g., a GC-PDCCH) via communication link 125-a. In some cases, a UE 115 may support different priorities for communications, different channel types, or different communication types than other UEs 115. For example, UE 115-a may support low latency communications such as URLLC while UE 115-b may support standard communications such as eMBB, or other higher latency communications as compared to URLLC. A transmission to UE 115-a and UE 115-b may be multiplexed using time-frequency resources allocated by base station 105-a. In some cases, UE 115-b may be scheduled to use a set of time-frequency resources that may also be allocated for higher priority (e.g., more urgent) URLLC traffic for UE 115-a. Thus, the base station 105-a may transmit control information (e.g., DCI) indicating time-frequency resources that may be preempted or canceled by UE 115-b. For instance, the base station 105-a may include a sequence of bits (e.g., a 14 bit sequence) within the DCI payload (e.g., in a PDCCH or GC-PDCCH) to indicate the time-frequency resources that may be preempted or canceled at UE 115-b so as to allow transmission of the higher priority traffic for UE 115-a.

In some cases, base station 105-a may indicate time-frequency resources to be preempted by UE 115-a, UE 115-b, or both. This indication may be a sequence of bits in a DCI message such as a DLPI. Base station 105-a may send the DLPI using a GC-PDCCH. If either UE 115-a, UE 115-b, or both have received a grant scheduling a PDSCH that overlaps with the resources indicated by the DLPI, then UE 115-a, UE 115-b, or both may determine to preempt the overlapping time-frequency resources (e.g., by refraining from monitoring the preempted resources for a PDSCH). In some cases, UE 115-a or UE 115-b may use this information to set the log likelihood ratios (LLRs) associated with the bits sent on the indicated time-frequency resources to zero, which may improve decoding probability (e.g., PDSCH decoding probability).

In some other cases, base station 105-a may indicate time-frequency resources to be canceled by UE 115-a, UE 115-b, or both. This indication may be a sequence of bits in a DCI message such as an ULCI or ULPI. Base station 105-a may send the ULCI using a group common PDCCH. If either UE 115-a, UE 115-b, or both are scheduled to transmit an uplink message (e.g., a PUSCH or an SRS) using resources that overlap with the resources indicated by the ULCI, then UE 115-a, UE 115-b, or both may determine to cancel the transmission of the uplink message over the overlapping portions.

In some examples, an uplink channel or a downlink channel may have an associated priority level. For example, an uplink channel, such as a dynamic grant PUSCH, may have a priority indicated in the DCI (e.g., by a one bit indicator in which a '1' indicates high priority and a '0' or no value indicates low priority) that schedules the PUSCH. Additionally or alternatively, a physical uplink control channel (PUCCH) HARQ-acknowledgement (ACK) priority may be implicitly indicated in the DCI scheduling a PUSCH or PDSCH. For example, the base station 105-a may configure a UE 115 with a number of codebooks (e.g., two HARQ-ACK codebooks for each UE 115). Each codebook may be configured with a priority level, which may also be the priority of the PUCCH used for the HARQ-ACK for the uplink or downlink channel. The DCI scheduling PUSCH or PDSCH may indicate to the UE 115 which codebook to use for HARQ-ACK feedback.

In some other examples, an uplink channel, such as a configured grant PUSCH or a scheduling request, may have a priority indicated via RRC signaling (e.g., an RRC configured priority associated with each configured PUSCH transmission or with each scheduling request resource).

Some transmissions may be designated as or may default to low priority (e.g., periodic channel state information (CSI), semi-persistent CSI, periodic SRS, or semi-periodic SRS).

In some cases, the UE 115 may receive a DLPI or ULCI, and preempt or cancel the indicated resource regardless of operation state at the UE 115 (e.g., regardless of whether the UE 115 is scheduled for or supports a given priority such as URLLC or eMBB criteria). That is, the UE 115 may apply a DLPI or ULCI to data regardless of a channel priority or regardless of which channels the base station 105 intended to preempt or cancel. In some cases, cancelling or preempting channels without considering priority may cause unnecessary cancellation or preemption, which may result in increased latency and inefficiency in the system (e.g., due to the granularity of the preemption indication).

In some examples, the base station 105 may semi-statically or dynamically configure a behavior of the UE 115 to apply DLPI or ULCI to a channel based on priority. For example, base station 105-a may indicate an operation state in configuration message 205-a to UE 115-a and an operation state in configuration message 205-b to UE 115-b via communications link 125-b. Additionally or alternatively, base station 105-a may send a single configuration message 205 for UE 115-a and UE 115-b indicating one or more operation states for UE 115-a and UE 115-b via communications link 125-b. The base station 105-a may indicate the operation state to the UE 115 using a parameter in RRC signaling, a SIB transmission, or any other information signaling performed by base station 105-a.

The operation state may correspond to how the UE 115 applies a DLPI or an ULCI to time-frequency resources scheduled for a channel based on the priority of the channel. For example, in a first operation state, the UE 115 may apply the DLPI or ULCI to scheduled time-frequency resources regardless of the priority of the channel. In some cases, base station 105-a may indicate a first operation state to UE 115-a in configuration message 205-a. Subsequently, UE 115-a may receive a DLPI indicating time-frequency resources for a channel to be preempted. In the first operation state, UE 115-a may determine to preempt time-frequency resources scheduled for high priority channel 215-a, such as a URLLC channel, or low priority channel 215-b, such as an eMBB channel (e.g., regardless of the priority of the channel).

Additionally or alternatively, UE 115-a may receive an ULCI indicating time-frequency resources scheduled for a channel to be canceled. In the first operation state, UE 115-a may determine to cancel time-frequency resources for high priority channel 215-a or low priority channel 215-b. In some cases, the base station 105 may indicate the first operation state to a UE 115 if the high priority channels for the UE 115 are relatively low priority when compared with other UEs 115 sharing the time-frequency resources (e.g., so the time-frequency resources of the UE 115 may be preempted or canceled in favor of the transmissions to or from the other UEs 115). That is, the priority of a channel associated with a first UE 115 may be relative to other channels associated with transmissions for other UEs 115.

In some cases, the base station 105 may indicate a second operation state to a UE 115. In the second operation state, the UE 115 may apply the DLPI or ULCI to time-frequency resources of low priority channels (e.g., low priority channel 215-b, which may be an eMBB channel, or other channels having a priority level below a given threshold), while maintaining communications scheduled in time-frequency resources for high priority channels (e.g., high priority channel 215-a, which may be an URLLC channel, or other channels having a priority level above a given threshold).

For example, base station 105-a may indicate a second operation state to UE 115-b in configuration message 205-b. In the second operation state, UE 115-b may determine to preempt the time-frequency resources scheduled for low priority channel 215-b and maintain time-frequency resources scheduled for high priority channel 215-a. Additionally or alternatively, UE 115-b may receive an ULCI indicating time-frequency resources to be canceled in high priority channel 215-a and low priority channel 215-b. In the second operation state, UE 115-b may determine to cancel time-frequency resources scheduled for low priority channel 215-b and maintain time-frequency resources scheduled for high priority channel 215-a.

In some cases, if the UE 115 is configured to monitor for a DLPI, an ULCI, or both, the base station 105-a may separately configure the parameter that indicates the operation state for DLPI and ULCI messages. In some other cases, the base station 105-a may jointly configure the parameter for DLPI and ULCI messages. Additionally or alternatively, the DLPI and ULCI may indicate resource preemption or cancellation on different carriers. In some examples, the base station 105-a may separately configure the parameter that indicates the operation state for the different carriers. In some other examples, the base station 105-a may jointly configure the parameter that indicates the operation state for the different carriers (e.g., by grouping different carriers). In such cases, if an ULCI points to resources on a first carrier, the ULCI may be applied to channels regardless of priority, while if the ULCI points to a second carrier, the low priority channels may be canceled. Similarly, if a DLPI points to resources on a first carrier, the DLPI may be applied to channels regardless of priority, while if the DLPI points to a second carrier, the low priority channels may be preempted.

In some examples, the PUCCH priority may not be used to indicate the PDSCH priority. In such examples, the base station 105 may configure one or more UEs 115 to apply a DLPI according to a first operation state. However, if the PUCCH priority is used to indicate the PDSCH (e.g., the two priorities are related), then the base station 105 may configure the one or more UEs 115 to apply a DLPI according to the second operation state.

The techniques described herein may allow a base station 105 to configure a UE 115 with an operation state related to a preemption indication (e.g., DLPI or ULCI). In a first operation state, the UE 115 may perform the preemption or cancellation of time-frequency resources regardless of a relative channel priority. In a second operation state, the UE 115 may perform the preemption or cancellation of time-frequency resources according to a relative channel priority (e.g., may preempt or cancel the resources for the relatively low priority channel 215-b). The UE 115 may communicate with the base station 105 using the remaining portion of the time-frequency resources (e.g., the time-frequency resources that have not been preempted or canceled). Thus, the UE 115 may avoid unnecessary preemptions or cancelations, which may improve efficiency and reduce latency in the wireless communications system 200.

Figure 3:
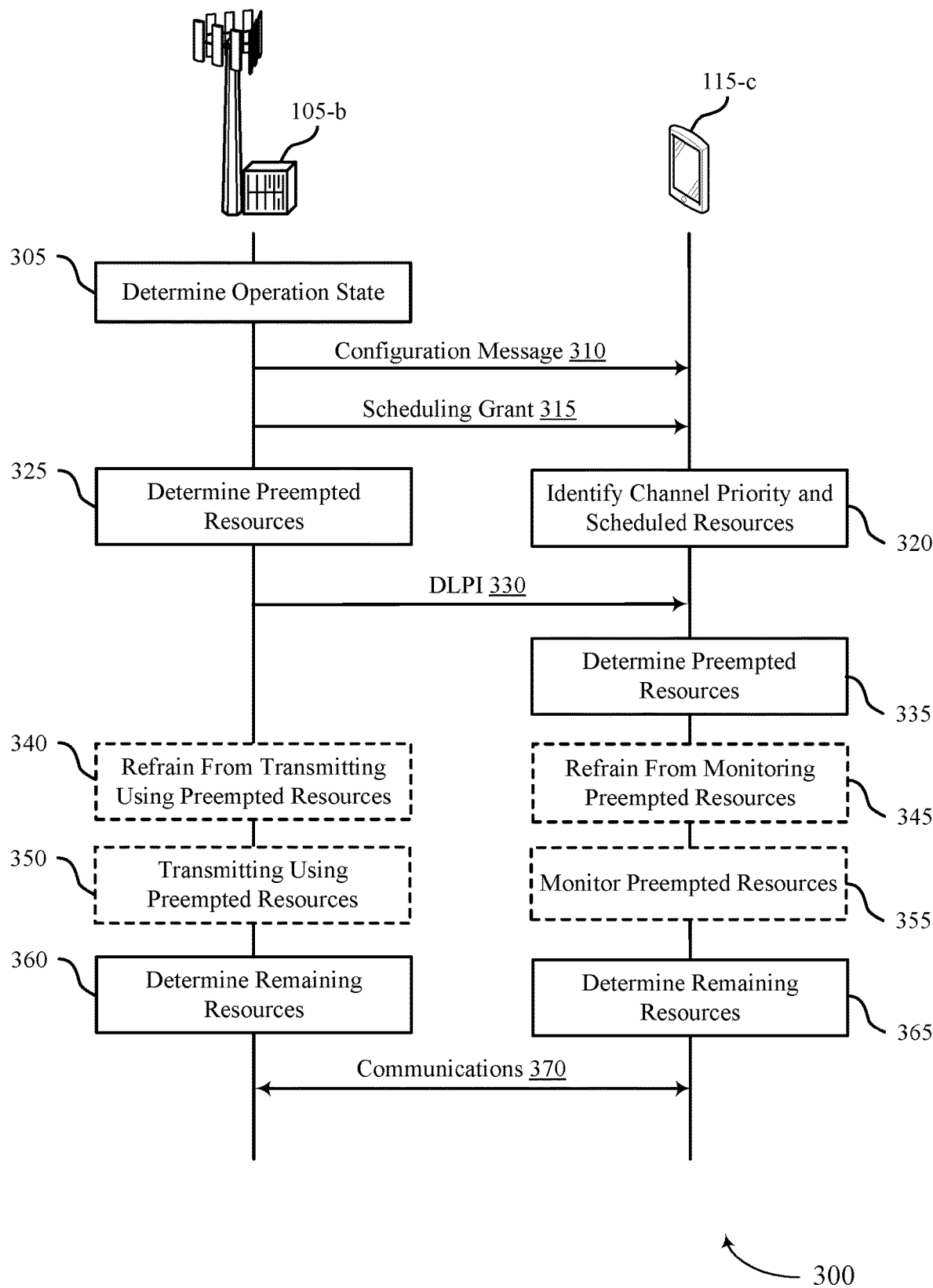
FIGS. 3 and 4 illustrate examples of process flows that support priority indication for downlink preemption in accordance with aspects of the present disclosure.

FIG. 3 illustrates an example of a process flow 300 that supports priority indication for downlink preemption and uplink cancellation in accordance with aspects of the present disclosure. In some examples, process flow 300 may implement aspects of wireless communications system 100 and wireless communications system 200. Process flow 300 includes UE 115-c and base station 105-b, which may be respective examples of a UE 115 and a base station 105 as described with reference to FIGS. 1 and 2. Alternative examples of the following may be implemented, where some processes are performed in a different order than described or are not performed. In some cases, processes may include additional features not mentioned below, or further processes may be added.

At 305, base station 105-*b* may determine an operation state for UE 115-*c*. In some cases, the operation state may correspond to how UE 115-*c* applies a preemption indication (e.g., a DLPI) based on a priority of a channel associated with the preemption indication.

At 310, base station 105-*b* may transmit a configuration message to UE 115-*c*. In some cases, the configuration message may include a parameter that indicates the operation state to UE 115-*c*.

At 315, base station 105-*b* may transmit a scheduling grant to UE 115-*c*. The scheduling grant may indicate time-frequency resources scheduled for a channel (e.g., a downlink channel such as a PDSCH). The channel may be associated with a given priority.

At 320, UE 115-*c* may identify the time-frequency resources scheduled for the channel and a priority associated with the channel. UE 115-*c* may identify the time-frequency resources scheduled for the channel based on the scheduled grant transmitted by the base station 105-*b* at 315.

At 325, base station 105-*b* may determine a set of time-frequency resources scheduled for UE 115-*c* that may be preempted. For example, base station 105-*b* may determine resources of the set of time-frequency resource scheduled for UE 115-*c* or other resources that are non-overlapping with the set of time-frequency resources scheduled for UE 115-*c*. Base station 105-*b* may determine the preempted resources based on transmissions scheduled for UE 115-*c* or for other UEs 115.

At 330, base station 105-*b* may transmit a DLPI to UE 115-*c*, which may indicate a set of or a number of preempted resources as determined at 325. For example, base station 105-*b* may transmit the DLPI using a sequence of bits in a DCI message (e.g., 14 bits). Subsequently, UE 115-*c* may receive a group common control channel (e.g., GC-PDCCH) carrying the DCI. The DCI may be intended for a group of UEs 115 that includes UE 115-*c*.

In some cases, base station 105-*b* may send a message indicating a set of time-frequency resources for the DLPI and may transmit the DLPI to UE 115-*c* using the time-frequency resources. UE 115-*c* may monitor the set of time-frequency resources and receive the DLPI based on monitoring.

At 335, UE 115-*c* may determine the time-frequency resources to be preempted, which may be indicated by the DLPI. The preempted time-frequency resources may be non-overlapping with a set of remaining time-frequency resources (e.g., after the DLPI has been applied). Additionally or alternatively, UE 115-*c* may determine a number of channels, including the channel identified from 315, in which UE 115-*c* may apply the DLPI based on the operation state. In some cases, the number of channels may include two or more channels with different priorities (e.g., a relatively high priority and a relatively low priority).

Subsequently and optionally, at 340 and 345, base station 105-*b* may refrain from transmitting using the preempted time-frequency resources, and UE 115-*c* may refrain from monitoring the preempted time-frequency resources according to a first operation state. For example, if the operation state is the first operation state, UE 115-*c* may apply the DLPI to the channel regardless of the priority of the channel.

Additionally or alternatively, and optionally at 350, base station 105-*b* may determine a set of preempted time-frequency resources for a second channel associated with a second priority that are non-overlapping with the remaining time-frequency resources. The second priority may be different from the priority of the channel at 340 and 345. Base station 105-*b* may transmit using the preempted time-frequency resources. Optionally at 355, UE 115-*c* may monitor the preempted time-frequency resources according to a second operation state. For example, if the operation state is the second operations state, UE 115-*c* may apply the DLPI to the second channel based on the second priority (e.g., UE 115-*c* may apply the DLPI to a relatively low priority channel and refrain from applying the DLPI to a relatively high priority channel). In some cases, the channels may be associated with different component carriers. For example, the channel may be associated with a first component carrier and the second channel may be associated with a second component carrier different from the first.

At 360 and 365, base station 105-*b* and UE 115-*c* may determine the remaining time-frequency resources based on the DLPI and the priority of the channel (e.g., after the DLPI is applied according to the operation state).

At 370, base station 105-*b* and UE 115-*c* may communicate (e.g., on the channel, such as a PDSCH) using the remaining portion of the time-frequency resources.

Figure 4:
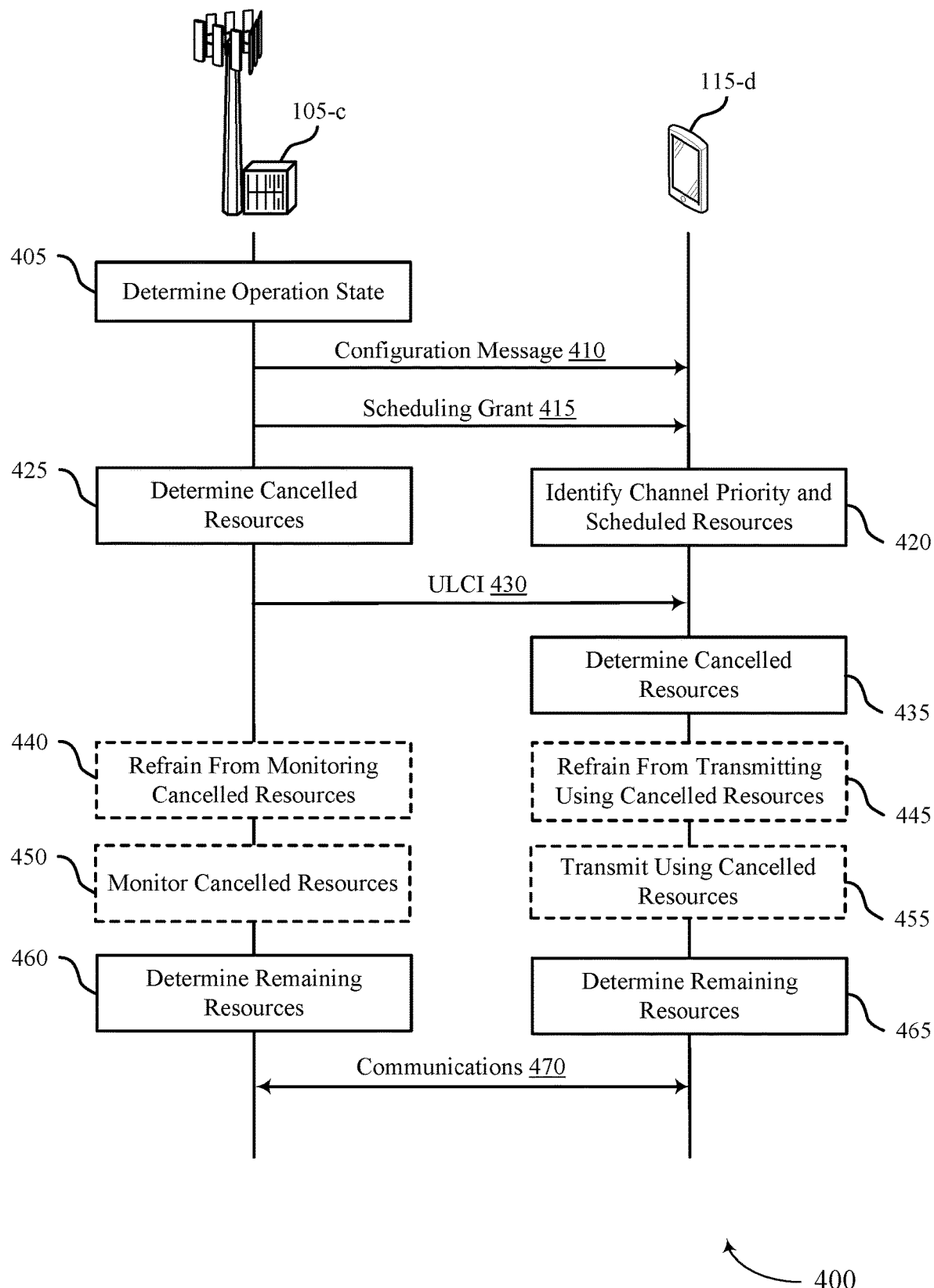

FIG. 4 illustrates an example of a process flow 400 that supports priority indication for downlink preemption and uplink cancellation in accordance with aspects of the present disclosure. In some examples, process flow 400 may implement aspects of wireless communications system 100 and wireless communications system 200. Process flow 400 includes UE 115-*d* and base station 105-*c*, which may be respective examples of a UE 115 and a base station 105 as described with reference to FIGS. 1 and 2. Alternative examples of the following may be implemented, where some processes are performed in a different order than described or are not performed. In some cases, processes may include additional features not mentioned below, or further processes may be added.

At 405, base station 105-*c* may determine an operation state for UE 115-*d*. In some cases, the operation state may correspond to how the UE 115-*d* applies a preemption indication (e.g., an ULCI) based on a priority of a channel associated with the preemption indication.

At 410, base station 105-*c* may transmit a configuration message to UE 115-*d*. In some cases, the configuration message may include a parameter that indicates the operation state to UE 115-*d*.

At 415, base station 105-*c* may transmit a scheduling grant to UE 115-*d*. The scheduling grant may indicate time-frequency resources scheduled for a channel (e.g., an uplink channel such as a PUSCH). The channel may be associated with a given priority.

At 420, UE 115-*d* may identify the time-frequency resources scheduled for the channel and a priority associated with the channel. UE 115-*d* may identify the time-frequency resources scheduled for the channel based on the scheduled grant transmitted by base station 105-*c* at 315.

At 425, base station 105-*c* may determine a number of time-frequency resources scheduled for UE 115-*d* that may be canceled. For example, base station 105-*c* may determine resources of the set of time-frequency resource scheduled for UE 115-*d* or other resources that are non-overlapping with the set of time-frequency resources scheduled for UE 115-*d*. Base station 105-*c* may determine the preempted resources based on transmissions scheduled for UE 115-*d* or for other UEs 115.

At 430, base station 105-c may transmit an ULCI to UE 115-d, which may indicate a set of or a number of canceled resources as determined at 425. For example, base station 105-c may transmit the ULCI using a sequence of bits in a DCI message (e.g., 14 bits). Subsequently, UE 115-d may receive a group common control channel (e.g., PDCCH) carrying the DCI. The DCI may be intended for a group of UEs 115 that includes UE 115-d.

In some cases, base station 105-c may send a message indicating a set of time-frequency resources for the ULCI and may subsequently transmit the ULCI to UE 115-d using the time-frequency resources. UE 115-d may monitor the set of time-frequency resources and receive the ULCI based on monitoring.

At 435, UE 115-d may determine the time-frequency resources to be canceled, which may be indicated by the ULCI. The canceled time-frequency resources may be non-overlapping with a set of remaining time-frequency resources (e.g., after the ULCI has been applied). Additionally or alternatively, UE 115-d may determine a number of channels, including the channel identified from 415, in which UE 115-d may apply the ULCI based on the operation state. In some cases, the number of channels may include two or more channels with different priorities (e.g., a relatively high priority and a relatively low priority).

Subsequently, and optionally at 440 and 445, base station 105-c may refrain from monitoring the canceled time-frequency resources, and UE 115-d may refrain from transmitting using the canceled time-frequency resources according to a first operation state. For example, if the operation state is the first operation state, UE 115-d may apply the ULCI to the channel regardless of the priority of the channel.

Additionally or alternatively, and optionally at 450, base station 105-c may determine a set of canceled time-frequency resources for a second channel associated with a second priority that are non-overlapping with the remaining time-frequency resources. The second priority may be different from the priority of the channel at 440 and 445. Base station 105-c may monitor the canceled time-frequency resources according to a second operation state.

Optionally at 455, UE 115-d may transmit an uplink message using the canceled time-frequency resources based on the operation state and the second priority. For example, if the operation state is the second operations state, UE 115-d may apply the ULCI to the second channel based on the second priority (e.g., UE 115-d may apply the ULCI to a relatively low priority channel and refrain from applying the ULCI to a relatively high priority channel). In some cases, the channels may be associated with different component carriers. For example, the channel may be associated with a first component carrier and the second channel may be associated with a second component carrier different from the first.

At 460 and 465, base station 105-c and UE 115-d may determine the remaining time-frequency resources based on the ULCI and the priority of the channel (e.g., after the ULCI is applied according to the operation state). At 470, base station 105-c and UE 115-d may communicate using the remaining portion of the time-frequency resources (e.g., on the channel, such as a PUSCH).

Figure 5:
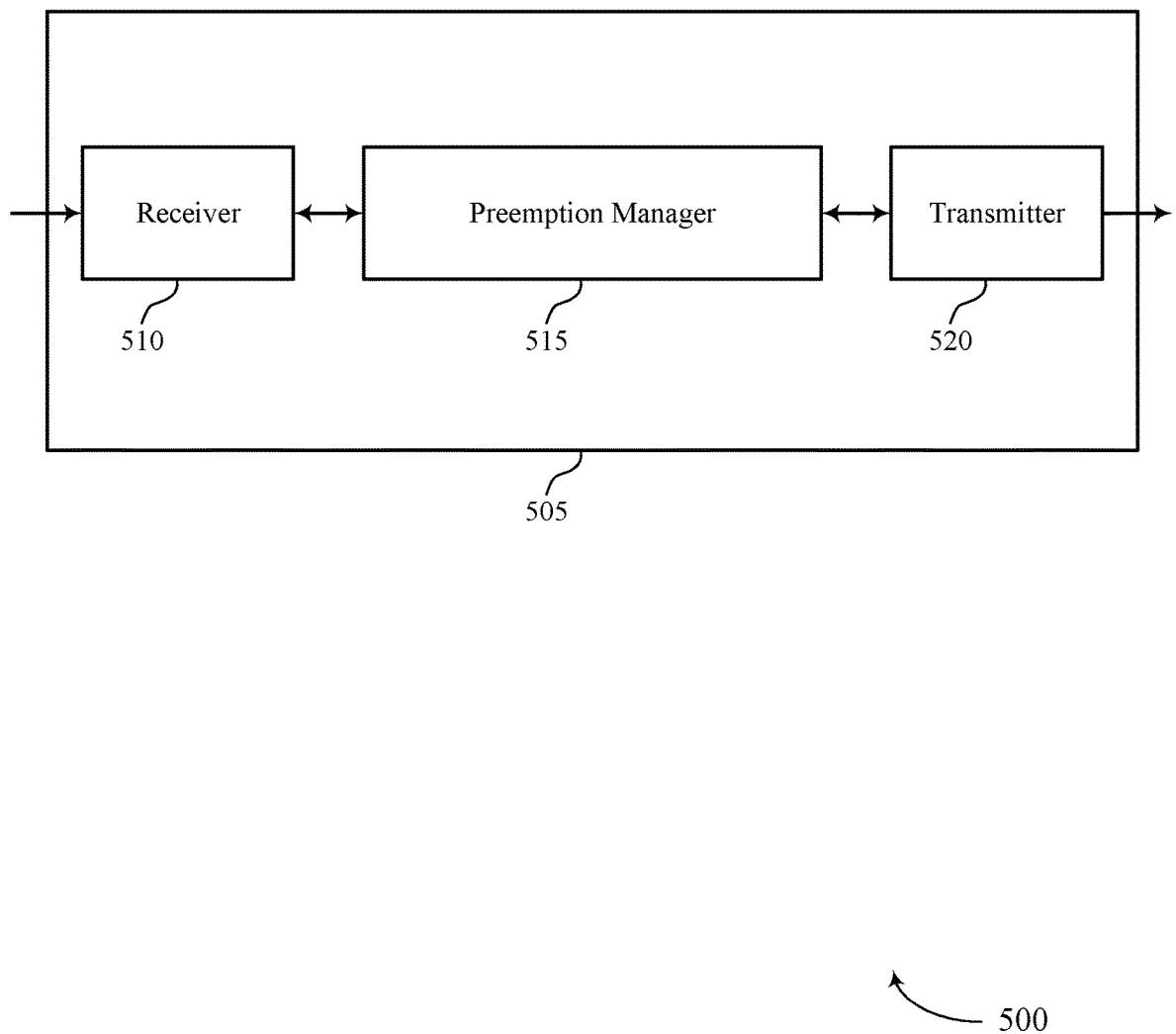
FIGS. 5 and 6 show block diagrams of devices that support priority indication for downlink preemption and uplink cancellation in accordance with aspects of the present disclosure.

FIG. 5 shows a block diagram 500 of a device 505 that supports priority indication for downlink preemption and uplink cancellation in accordance with aspects of the present disclosure. The device 505 may be an example of aspects of a UE 115 as described herein. The device 505 may include a receiver 510, a preemption manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to priority indication for downlink preemption and uplink cancellation, etc.). Information may be passed on to other components of the device 505. The receiver 510 may be an example of aspects of the transceiver 820 described with reference to FIG. 8. The receiver 510 may utilize a single antenna or a set of antennas.

The preemption manager 515 may receive, from a base station, a configuration message including a parameter that indicates an operation state by the UE to apply a preemption indication (e.g., DLPI or ULCI) based on a priority of a channel associated with the preemption indication, identify the priority of the channel and time-frequency resources scheduled for the channel, receive an instance of the preemption indication, determine, based on the received instance of the preemption indication and the identified priority of the channel, a remaining portion of the identified time-frequency resources, and communicate with the base station using the remaining portion of the time-frequency resources. The preemption manager 515 may be an example of aspects of the preemption manager 810 described herein.

The preemption manager 515, or its sub-components, may be implemented in hardware, code (e.g., software or firmware) executed by a processor, or any combination thereof. If implemented in code executed by a processor, the functions of the preemption manager 515, or its sub-components may be executed by a general-purpose processor, a digital signaling processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The preemption manager 515, or its sub-components, may be physically located at various positions, including being distributed such that portions of functions are implemented at different physical locations by one or more physical components. In some examples, the preemption manager 515, or its sub-components, may be a separate and distinct component in accordance with various aspects of the present disclosure. In some examples, the preemption manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
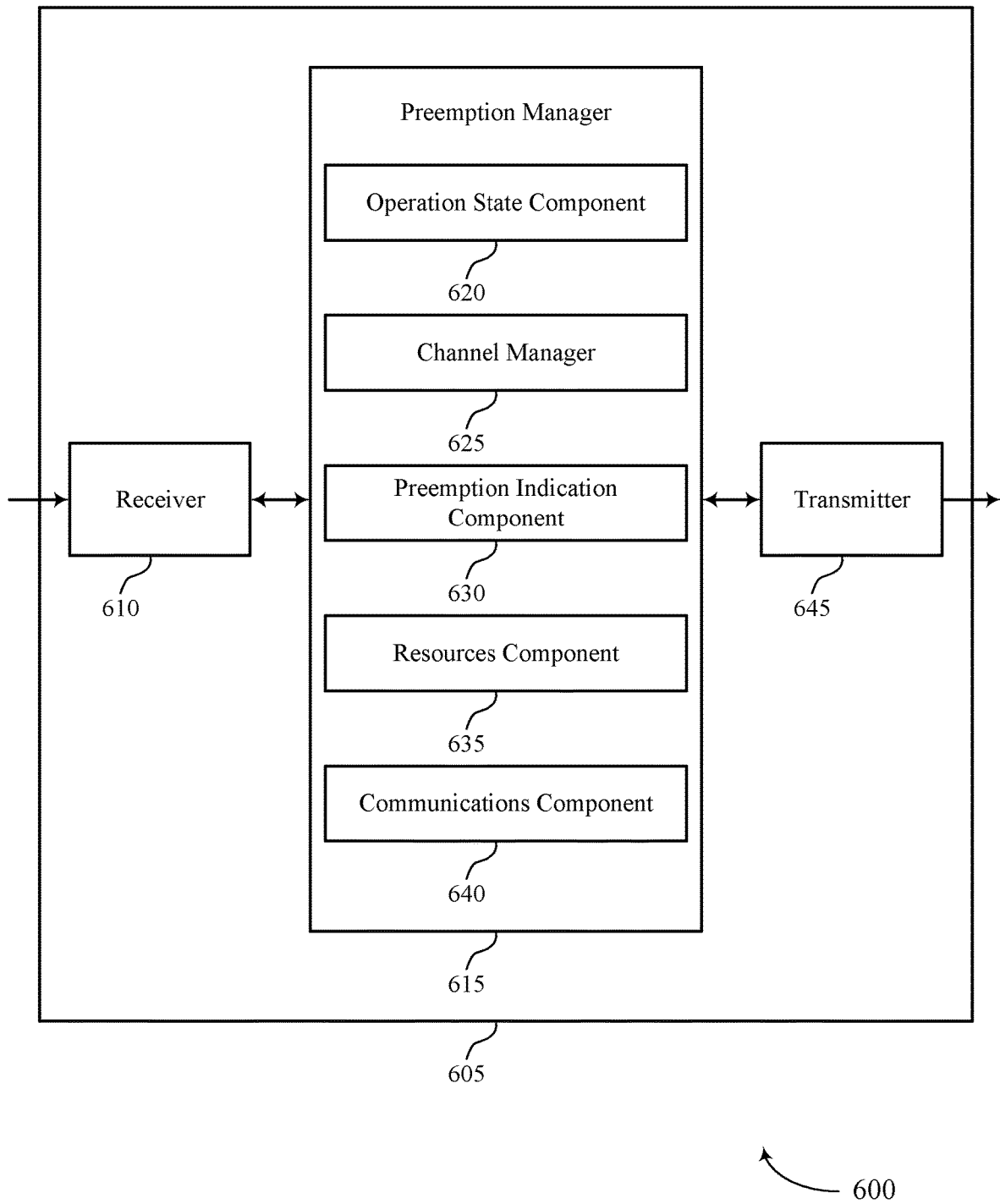

FIG. 6 shows a block diagram 600 of a device 605 that supports priority indication for downlink preemption and uplink cancellation in accordance with aspects of the present disclosure. The device 605 may be an example of aspects of a device 505, or a UE 115 as described herein. The device 605 may include a receiver 610, a preemption manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to priority indication for downlink preemption and uplink cancellation, etc.). Information may be passed on to other components of the device 605. The receiver 610 may be an example of aspects of the transceiver 820 described with reference to FIG. 8. The receiver 610 may utilize a single antenna or a set of antennas.

The preemption manager 615 may be an example of aspects of the preemption manager 515 as described herein. The preemption manager 615 may include an operation state component 620, a channel manager 625, a preemption indication component 630, a resources component 635, and a communications component 640. The preemption manager 615 may be an example of aspects of the preemption manager 810 described herein.

The operation state component 620 may receive, from a base station, a configuration message including a parameter that indicates an operation state by the UE to apply a preemption indication (e.g., DLPI or ULCI) based on a priority of a channel associated with the preemption indication.

The channel manager 625 may identify the priority of the channel and time-frequency resources scheduled for the channel. The preemption indication component 630 may receive an instance of the preemption indication. The resources component 635 may determine, based on the received instance of the preemption indication and the identified priority of the channel, a remaining portion of the identified time-frequency resources. The communications component 640 may communicate with the base station using the remaining portion of the time-frequency resources.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
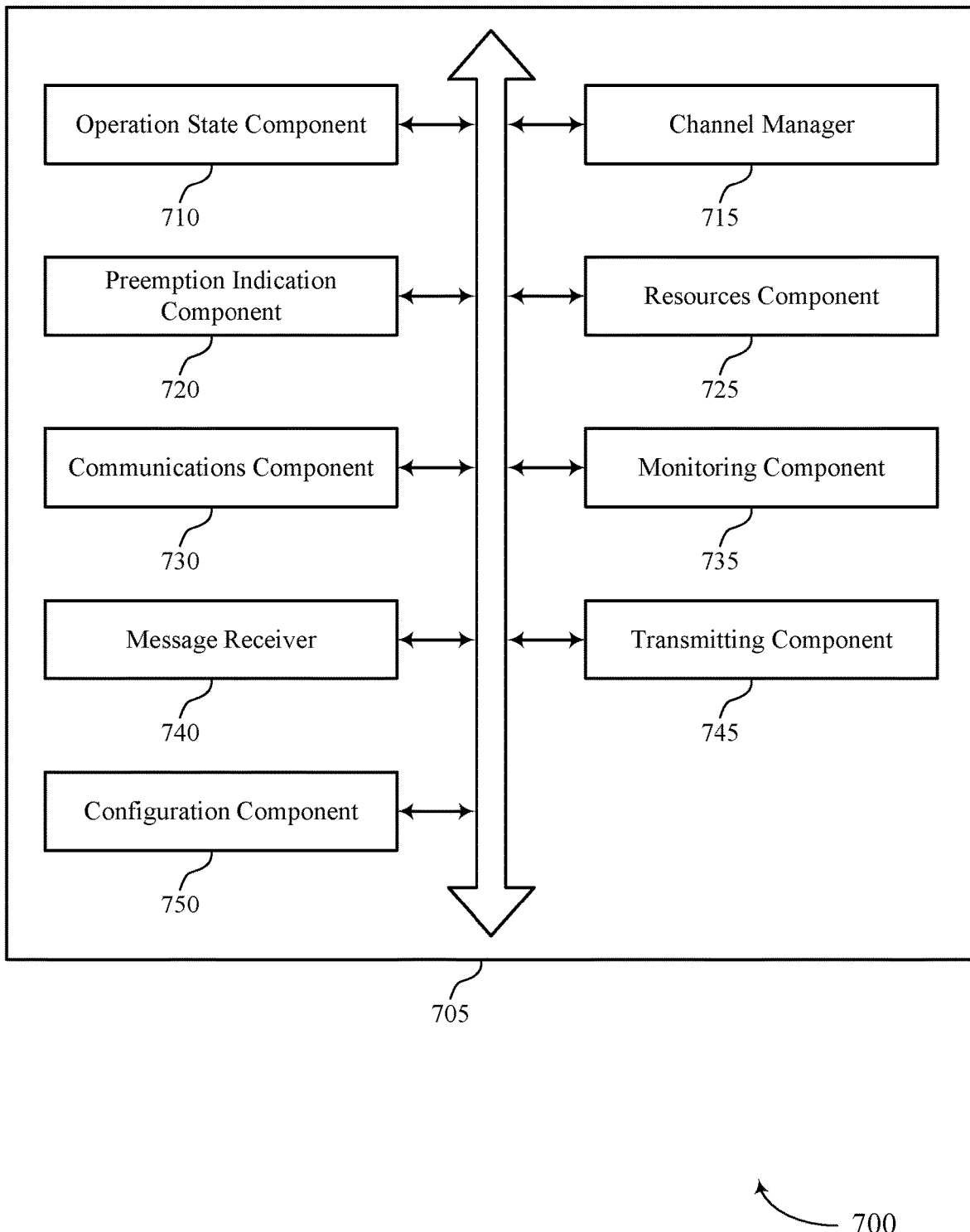
FIG. 7 shows a block diagram of a preemption manager that supports priority indication for downlink preemption and uplink cancellation in accordance with aspects of the present disclosure.

FIG. 7 shows a block diagram 700 of a preemption manager 705 that supports priority indication for downlink preemption and uplink cancellation in accordance with aspects of the present disclosure. The preemption manager 705 may be an example of aspects of a preemption manager 515, a preemption manager 615, or a preemption manager 810 described herein. The preemption manager 705 may include an operation state component 710, a channel manager 715, a preemption indication component 720, a resources component 725, a communications component 730, a monitoring component 735, a message receiver 740, a transmitting component 745, and a configuration component 750. Each of these modules may communicate, directly or indirectly, with one another (e.g., via one or more buses).

The operation state component 710 may receive, from a base station, a configuration message including a parameter that indicates an operation state by the UE to apply a preemption indication (e.g., DLPI or ULCI) based on a priority of a channel associated with the preemption indication.

The channel manager 715 may identify the priority of the channel and time-frequency resources scheduled for the channel. In some examples, the channel manager 715 may determine a set of time-frequency resources scheduled for a second channel associated with a second priority different from the priority of the channel, the set of time-frequency resources non-overlapping with the remaining portion of the time-frequency resources. In some cases, the second channel may be associated with a carrier different than the channel.

In some examples, the channel manager 715 may receive a message indicating a set of time-frequency resources for the ULCI. In some examples, the channel manager 715 may determine a set of channels including the channel in which the UE may apply the preemption indication based on the operation state. In some cases, the set of channels includes at least two channels with different priorities.

The preemption indication component 720 may receive an instance of the preemption indication. In some cases, the preemption indication includes a DLPI. In some cases, the preemption indication includes an ULCI.

The resources component 725 may determine, based on the received instance of the preemption indication and the identified priority of the channel, a remaining portion of the identified time-frequency resources. In some examples, the resources component 725 may determine a set of time-frequency resources of the identified time-frequency resources scheduled for the channel, the set of time-frequency resources non-overlapping with the remaining portion of the time-frequency resources.

The communications component 730 may communicate with the base station using the remaining portion of the time-frequency resources. The monitoring component 735 may refrain from monitoring the set of time-frequency resources based on the DLPI.

In some examples, the monitoring component 735 may monitor the set of time-frequency resources for the second channel based on the operation state and the DLPI being associated with the priority. In some examples, the monitoring component 735 may monitor the set of time-frequency resources for the DLPI, where receiving the instance of the preemption indication is based on the monitoring. In some examples, the monitoring component 735 may monitor the set of time-frequency resources for the ULCI, where receiving the instance of the preemption indication is based on the monitoring.

The message receiver 740 may receive a message indicating a set of time-frequency resources for the DLPI. In some examples, the message receiver 740 may receive a first message configuring the UE to monitor for the DLPI. In some examples, the message receiver 740 may receive a second message configuring the UE to monitor for the ULCI. The transmitting component 745 may refrain from transmitting an uplink message using the set of time-frequency resources based on the ULCI.

In some examples, the transmitting component 745 may transmit the second channel using the set of time-frequency resources based on the operation state and the ULCI being associated with the priority. The configuration component 750 may configure the UE to monitor for both a DLPI and an ULCI.

Figure 8:
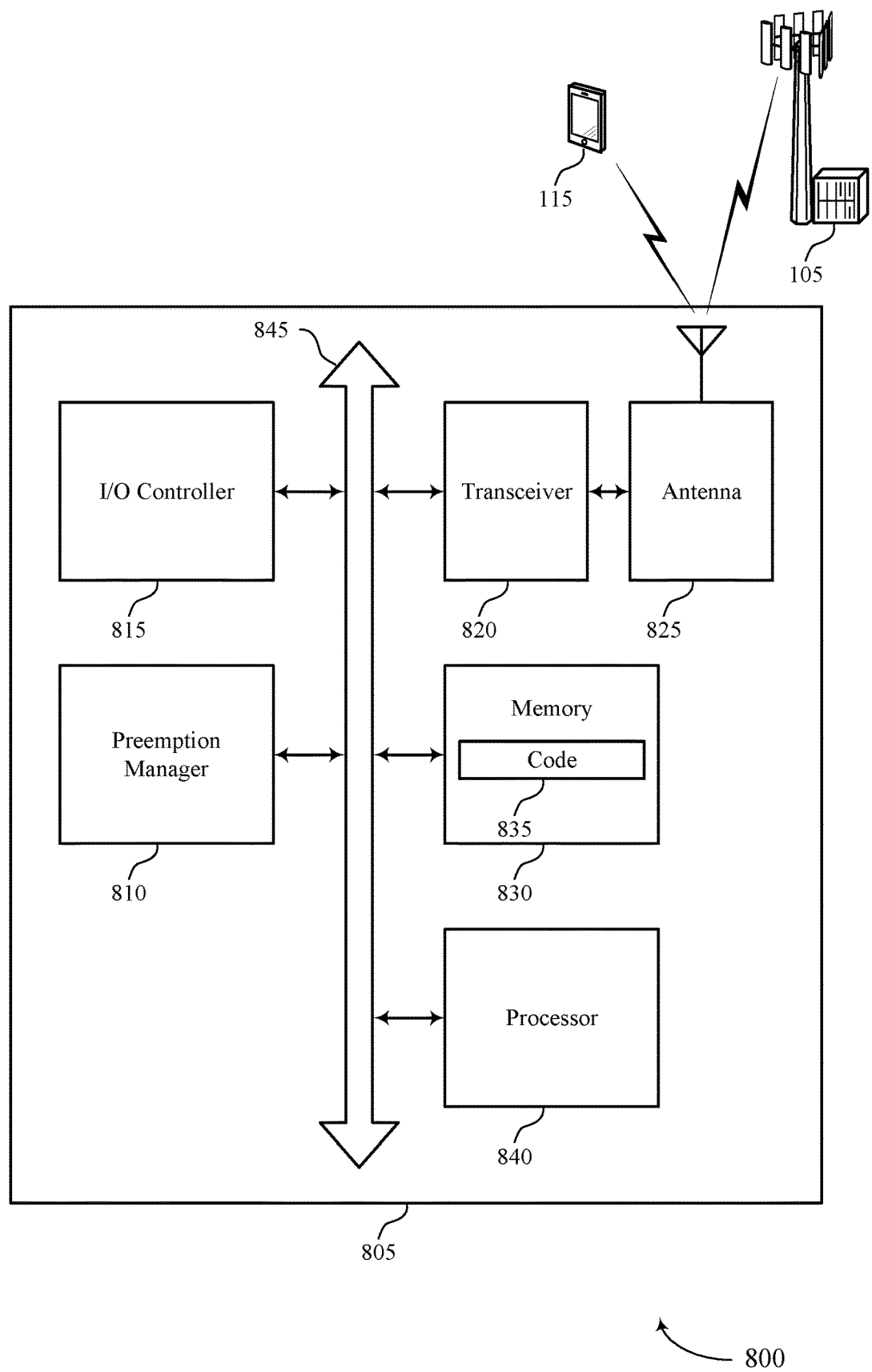
FIG. 8 shows a diagram of a system including a device that supports priority indication for downlink preemption and uplink cancellation in accordance with aspects of the present disclosure.

FIG. 8 shows a diagram of a system 800 including a device 805 that supports priority indication for downlink preemption and uplink cancellation in accordance with aspects of the present disclosure. The device 805 may be an example of or include the components of device 505, device 605, or a UE 115 as described herein. The device 805 may include components for bi-directional voice and data communications including components for transmitting and receiving communications, including a preemption manager 810, an I/O controller 815, a transceiver 820, an antenna

825, memory 830, and a processor 840. These components may be in electronic communication via one or more buses (e.g., bus 845).

The preemption manager 810 may receive, from a base station, a configuration message including a parameter that indicates an operation state by the UE to apply a preemption indication (e.g., DLPI or ULCI) based on a priority of a channel associated with the preemption indication, identify the priority of the channel and time-frequency resources scheduled for the channel, receive an instance of the preemption indication, determine, based on the received instance of the preemption indication and the identified priority of the channel, a remaining portion of the identified time-frequency resources, and communicate with the base station using the remaining portion of the time-frequency resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In some other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the device 805 may include a single antenna 825 or may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting priority indication for downlink preemption and uplink cancellation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
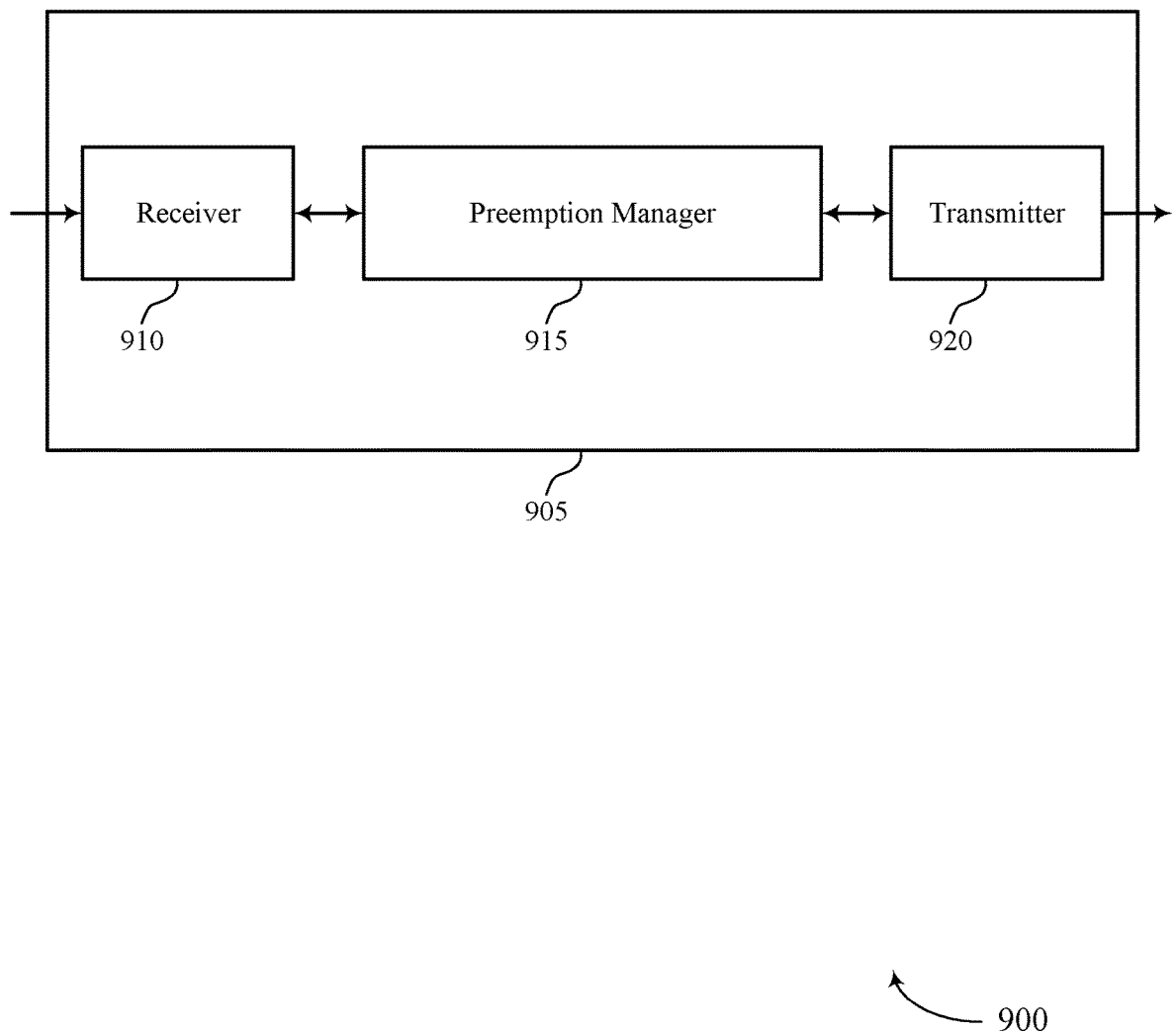
FIGS. 9 and 10 show block diagrams of devices that support priority indication for downlink preemption and uplink cancellation in accordance with aspects of the present disclosure.

FIG. 9 shows a block diagram 900 of a device 905 that supports priority indication for downlink preemption and uplink cancellation in accordance with aspects of the present disclosure. The device 905 may be an example of aspects of a base station 105 as described herein. The device 905 may include a receiver 910, a preemption manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to priority indication for downlink preemption and uplink cancellation, etc.). Information may be passed on to other components of the device 905. The receiver 910 may be an example of aspects of the transceiver 1220 described with reference to FIG. 12. The receiver 910 may utilize a single antenna or a set of antennas.

The preemption manager 915 may determine an operation state for a UE to apply a preemption indication (e.g., DLPI or ULCI) based on a priority of a channel associated with the preemption indication, transmit, to the UE, a configuration message including a parameter that indicates the operation state, transmit, to the UE, a grant indicating time-frequency resources scheduled for the channel, transmit an instance of the preemption indication, determine, based on the instance of the preemption indication and the priority of the channel, a remaining portion of the identified time-frequency resources, and communicate with the UE using the remaining portion of the time-frequency resources. The preemption manager 915 may be an example of aspects of the preemption manager 1210 described herein.

The preemption manager 915, or its sub-components, may be implemented in hardware, code (e.g., software or firmware) executed by a processor, or any combination thereof. If implemented in code executed by a processor, the functions of the preemption manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The actions performed by the preemption manager 915 as described herein may be implemented to realize one or more potential advantages. One implementation may enable a base station to configure a UE with an operation state related to a preemption indication. Such configuration may enable techniques for time-frequency resource preemption or cancellation at a UE based on a channel priority and the operation state, which may result in higher data rates and more efficient communications (e.g., less communication errors), among other advantages.

Based on implementing the configuration as described herein, a processor of a UE or base station (e.g., a processor controlling the receiver 910, the preemption manager 915, the transmitter 920, or a combination thereof) may reduce the impact or likelihood of preemption or cancellation errors in a communications system while ensuring relatively efficient communications. For example, the configuring techniques described herein may leverage a relationship between the priority of the channels related to the preemption indication as well as the operation state of the UE, which may realize reduced signaling overhead and power savings, among other benefits.

The preemption manager 915, or its sub-components, may be physically located at various positions, including being distributed such that portions of functions are implemented at different physical locations by one or more physical components. In some examples, the preemption manager 915, or its sub-components, may be a separate and distinct component in accordance with various aspects of the present disclosure. In some examples, the preemption manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
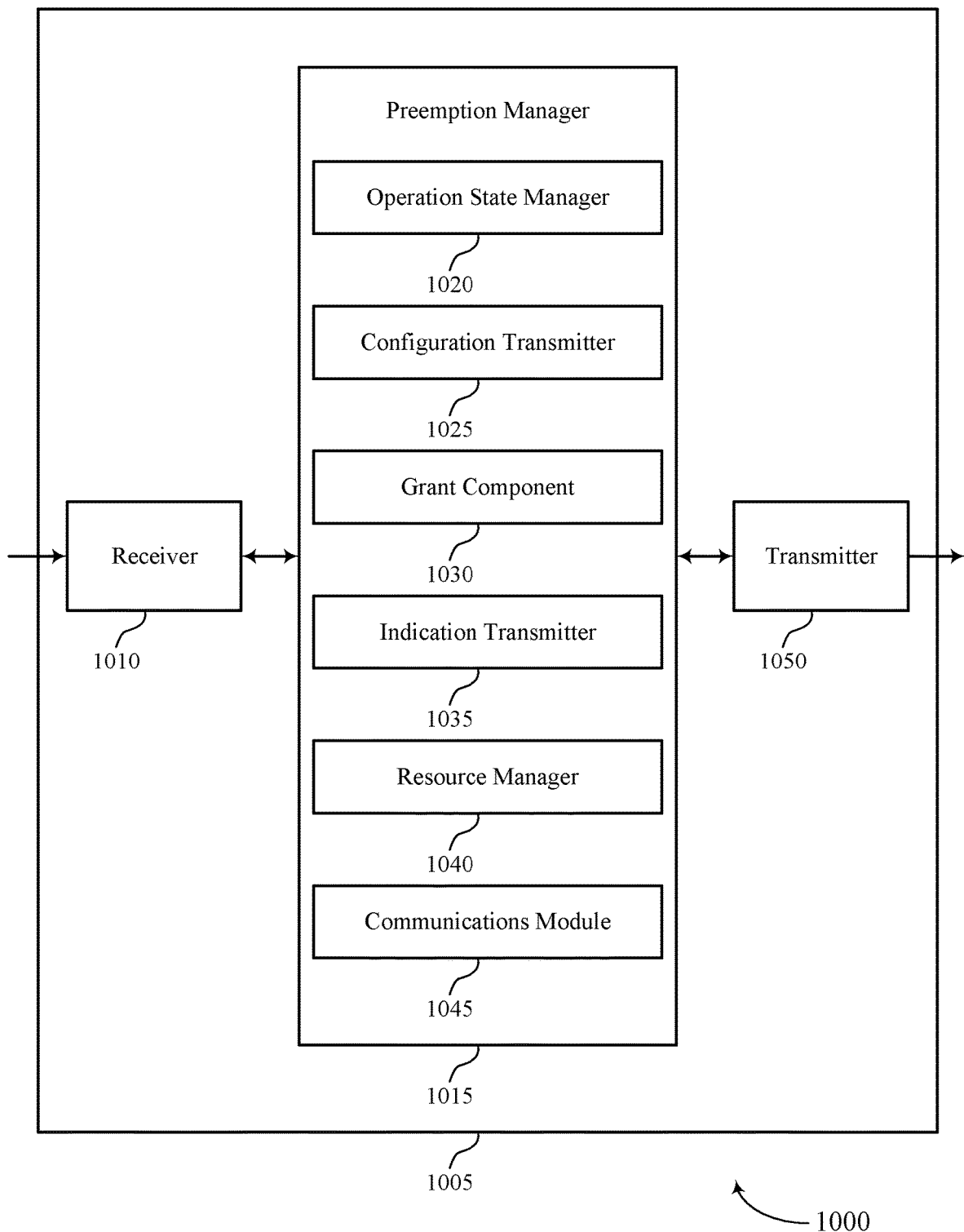

FIG. 10 shows a block diagram 1000 of a device 1005 that supports priority indication for downlink preemption and uplink cancellation in accordance with aspects of the present disclosure. The device 1005 may be an example of aspects of a device 905, or a base station 105 as described herein. The device 1005 may include a receiver 1010, a preemption manager 1015, and a transmitter 1050. The device 1005 may also include a processor. Each of these components may be in communication with one another (e.g., via one or more buses).

The receiver 1010 may receive information such as packets, user data, or control information associated with various information channels (e.g., control channels, data channels, and information related to priority indication for downlink preemption and uplink cancellation, etc.). Information may be passed on to other components of the device 1005. The receiver 1010 may be an example of aspects of the transceiver 1220 described with reference to FIG. 12. The receiver 1010 may utilize a single antenna or a set of antennas.

The preemption manager 1015 may be an example of aspects of the preemption manager 915 as described herein. The preemption manager 1015 may include an operation state manager 1020, a configuration transmitter 1025, a grant component 1030, an indication transmitter 1035, a resource manager 1040, and a communications module 1045. The preemption manager 1015 may be an example of aspects of the preemption manager 1210 described herein.

The operation state manager 1020 may determine an operation state for a UE to apply a preemption indication (e.g., DLPI or ULCI) based on a priority of a channel associated with the preemption indication. The configuration transmitter 1025 may transmit, to the UE, a configuration message including a parameter that indicates the operation state. The grant component 1030 may transmit, to the UE, a grant indicating time-frequency resources scheduled for the channel.

The indication transmitter 1035 may transmit an instance of the preemption indication. The resource manager 1040 may determine, based on the instance of the preemption indication and the priority of the channel, a remaining portion of the identified time-frequency resources. The communications module 1045 may communicate with the UE using the remaining portion of the time-frequency resources.

The transmitter 1050 may transmit signals generated by other components of the device 1005. In some examples, the transmitter 1050 may be collocated with a receiver 1010 in a transceiver module. For example, the transmitter 1050 may be an example of aspects of the transceiver 1220 described with reference to FIG. 12. The transmitter 1050 may utilize a single antenna or a set of antennas.

Figure 11:
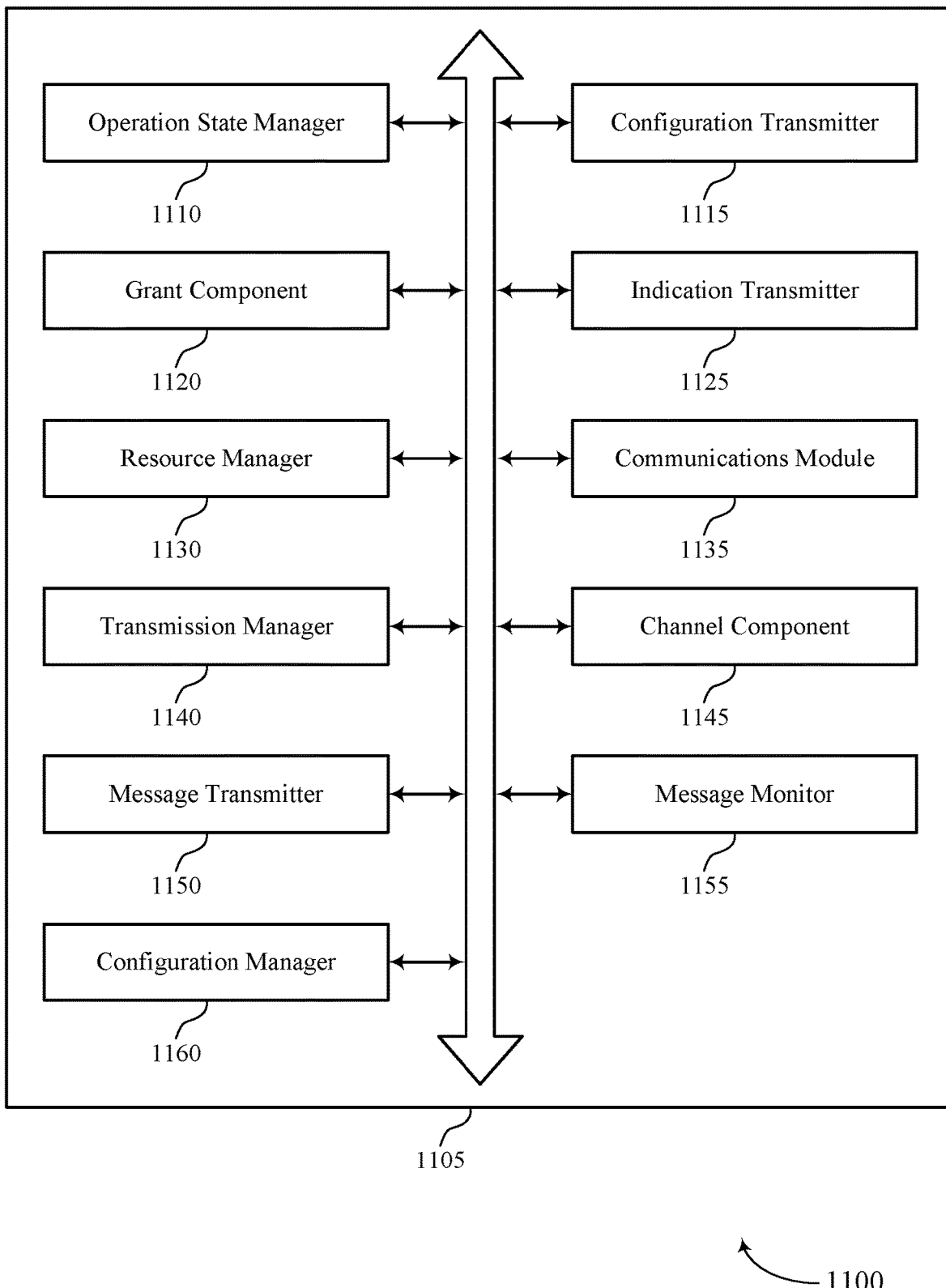
FIG. 11 shows a block diagram of a preemption manager that supports priority indication for downlink preemption and uplink cancellation in accordance with aspects of the present disclosure.

FIG. 11 shows a block diagram 1100 of a preemption manager 1105 that supports priority indication for downlink preemption and uplink cancellation in accordance with aspects of the present disclosure. The preemption manager 1105 may be an example of aspects of a preemption manager 915, a preemption manager 1015, or a preemption manager 1210 described herein. The preemption manager 1105 may include an operation state manager 1110, a configuration transmitter 1115, a grant component 1120, an indication transmitter 1125, a resource manager 1130, a communications module 1135, a transmission manager 1140, a channel component 1145, a message transmitter 1150, a message monitor 1155, and a configuration manager 1160. Each of these modules may communicate, directly or indirectly, with one another (e.g., via one or more buses).

The operation state manager 1110 may determine an operation state for a UE to apply a preemption indication (e.g., DLPI or ULCI) based on a priority of a channel associated with the preemption indication. The configuration transmitter 1115 may transmit, to the UE, a configuration message including a parameter that indicates the operation state. The grant component 1120 may transmit, to the UE, a grant indicating time-frequency resources scheduled for the channel.

The indication transmitter 1125 may transmit an instance of the preemption indication. In some cases, the preemption indication includes a DLPI. In some cases, the preemption indication includes an ULCI. In some examples, the indication transmitter 1125 may transmit a DLPI using the set of time-frequency resources. In some examples, the indication transmitter 1125 may transmit an ULCI using the set of time-frequency resources.

The resource manager 1130 may determine, based on the instance of the preemption indication and the priority of the channel, a remaining portion of the identified time-frequency resources. In some examples, the resource manager 1130 may determine a set of time-frequency resources of the identified time-frequency resources scheduled for the channel, the set of time-frequency resources non-overlapping with the remaining portion of the time-frequency resources. The communications module 1135 may communicate with the UE using the remaining portion of the time-frequency resources.

The transmission manager 1140 may refrain from transmitting the channel using the time-frequency resources based on the DLPI. In some examples, the transmission manager 1140 may transmit the second channel using the set of time-frequency resources based on the operation state and the DLPI being associated with the priority.

The channel component 1145 may determine a set of time-frequency resources for a second channel associated with a second priority different from the priority of the channel, the set of time-frequency resources non-overlapping with the remaining portion of the time-frequency resources. In some cases, the second channel may be associated with a carrier different than the channel.

The message transmitter 1150 may transmit a message indicating a set of time-frequency resources for the DLPI. In some examples, the message transmitter 1150 may transmit a message indicating a set of time-frequency resources for the ULCI. In some examples, the message transmitter 1150 may transmit a first message configuring the UE to monitor for the DLPI. In some examples, the message transmitter 1150 may transmit a second message configuring the UE to monitor for the ULCI.

The message monitor 1155 may refrain from monitoring the set of time-frequency resources for an uplink message from the UE based on the ULCI. In some examples, the message monitor 1155 may monitor the set of time-frequency resources for the second channel based on the operation state and the ULCI being associated with the priority. The configuration manager 1160 may configure the UE to monitor for both a DLPI and an ULCI.

Figure 12:
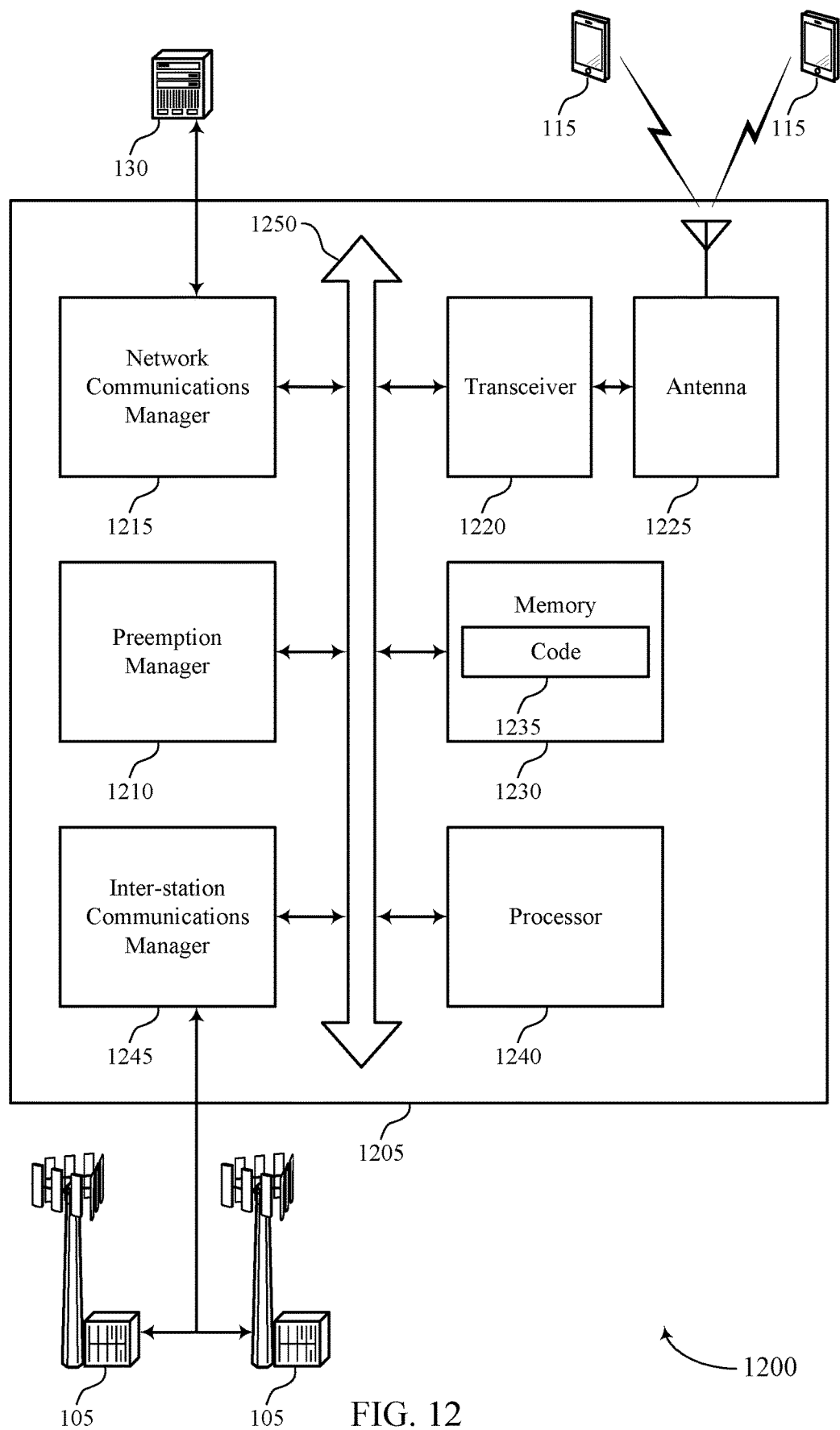
FIG. 12 shows a diagram of a system including a device that supports priority indication for downlink preemption and uplink cancellation in accordance with aspects of the present disclosure.

FIG. 12 shows a diagram of a system 1200 including a device 1205 that supports priority indication for downlink preemption and uplink cancellation in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a preemption manager 1210, a network communications manager 1215, a transceiver 1220, an antenna 1225, memory 1230, a processor 1240, and an inter-station communications manager 1245. These components may be in electronic communication via one or more buses (e.g., bus 1250).

The preemption manager 1210 may determine an operation state for a UE to apply a preemption indication (e.g., DLPI or ULCI) based on a priority of a channel associated with the preemption indication, transmit, to the UE, a configuration message including a parameter that indicates the operation state, transmit, to the UE, a grant indicating time-frequency resources scheduled for the channel, transmit an instance of the preemption indication, determine, based on the instance of the preemption indication and the priority of the channel, a remaining portion of the identified time-frequency resources, and communicate with the UE using the remaining portion of the time-frequency resources.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting priority indication for downlink preemption and uplink cancellation).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
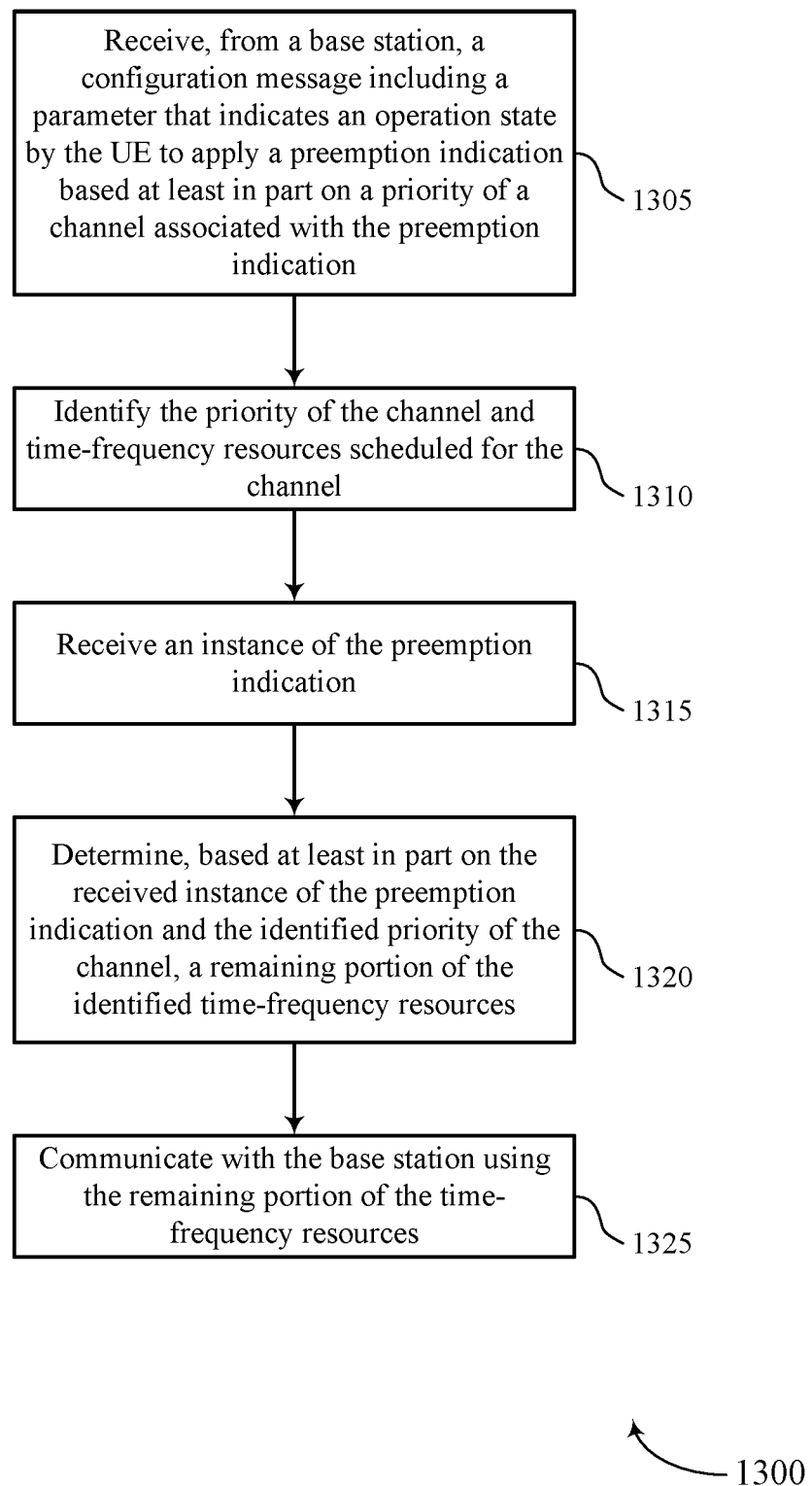
FIGS. 13 through 18 show flowcharts illustrating methods that support priority indication for downlink preemption and uplink cancellation in accordance with aspects of the present disclosure.

FIG. 13 shows a flowchart illustrating a method 1300 that supports priority indication for downlink preemption and uplink cancellation in accordance with aspects of the present disclosure. The operations of method 1300 may be implemented by a UE 115 or its components as described herein. For example, the operations of method 1300 may be performed by a preemption manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a configuration message including a parameter that indicates an operation state by the UE to apply a preemption indication (e.g., DLPI or ULCI) based at least in part on a priority of a channel associated with the preemption indication. The operations of 1305 may be performed according to the methods described herein. In some examples, aspects of the operations of 1305 may be performed by an operation state component as described with reference to FIGS. 5 through 8.

At 1310, the UE may identify the priority of the channel and time-frequency resources scheduled for the channel. The operations of 1310 may be performed according to the methods described herein. In some examples, aspects of the operations of 1310 may be performed by a channel manager as described with reference to FIGS. 5 through 8.

At 1315, the UE may receive an instance of the preemption indication. The operations of 1315 may be performed according to the methods described herein. In some examples, aspects of the operations of 1315 may be performed by a preemption indication component as described with reference to FIGS. 5 through 8.

At 1320, the UE may determine, based at least in part on the received instance of the preemption indication and the identified priority of the channel, a remaining portion of the identified time-frequency resources. The operations of 1320 may be performed according to the methods described herein. In some examples, aspects of the operations of 1320 may be performed by a resources component as described with reference to FIGS. 5 through 8.

At 1325, the UE may communicate with the base station using the remaining portion of the time-frequency resources. The operations of 1325 may be performed according to the methods described herein. In some examples, aspects of the operations of 1325 may be performed by a communications component as described with reference to FIGS. 5 through 8.

Figure 14:
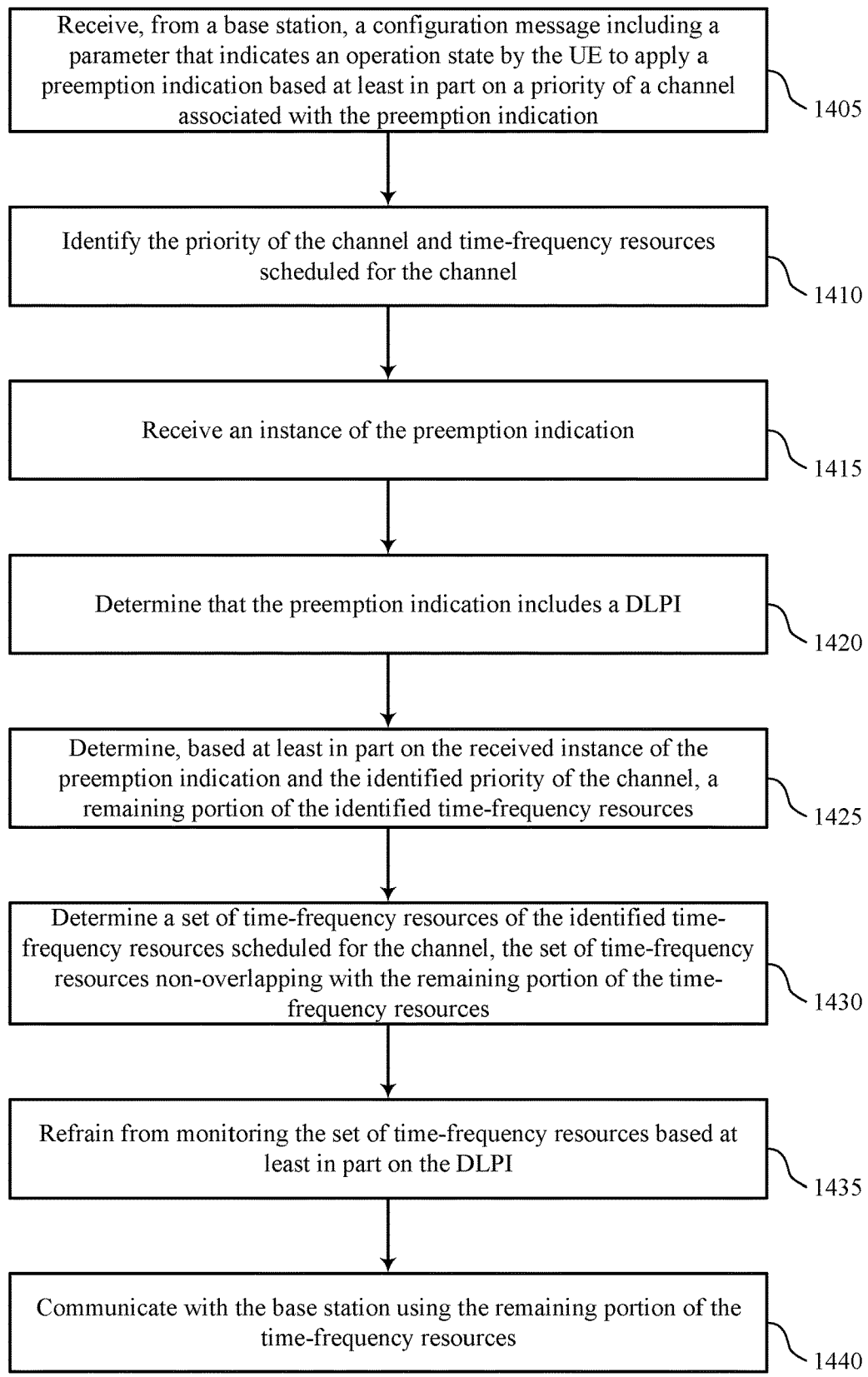

FIG. 14 shows a flowchart illustrating a method 1400 that supports priority indication for downlink preemption and uplink cancellation in accordance with aspects of the present disclosure. The operations of method 1400 may be implemented by a UE 115 or its components as described herein. For example, the operations of method 1400 may be performed by a preemption manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a configuration message including a parameter that indicates an operation state by the UE to apply a preemption indication (e.g., DLPI or ULCI) based at least in part on a priority of a channel associated with the preemption indication. The operations of 1405 may be performed according to the methods described herein. In some examples, aspects of the operations of 1405 may be performed by an operation state component as described with reference to FIGS. 5 through 8.

At 1410, the UE may identify the priority of the channel and time-frequency resources scheduled for the channel. The operations of 1410 may be performed according to the methods described herein. In some examples, aspects of the operations of 1410 may be performed by a channel manager as described with reference to FIGS. 5 through 8.

At 1415, the UE may receive an instance of the preemption indication. The operations of 1415 may be performed according to the methods described herein. In some examples, aspects of the operations of 1415 may be performed by a preemption indication component as described with reference to FIGS. 5 through 8.

At 1420, the UE may determine that the preemption indication includes a DLPI. The operations of 1420 may be performed according to the methods described herein. In some examples, aspects of the operations of 1420 may be performed by a preemption indication component as described with reference to FIGS. 5 through 8.

At 1425, the UE may determine, based at least in part on the received instance of the preemption indication and the identified priority of the channel, a remaining portion of the identified time-frequency resources. The operations of 1425 may be performed according to the methods described herein. In some examples, aspects of the operations of 1425 may be performed by a resources component as described with reference to FIGS. 5 through 8.

At 1430, the UE may determine a set of time-frequency resources of the identified time-frequency resources scheduled for the channel, the set of time-frequency resources non-overlapping with the remaining portion of the time-frequency resources. The operations of 1430 may be performed according to the methods described herein. In some examples, aspects of the operations of 1430 may be performed by a resources component as described with reference to FIGS. 5 through 8.

At 1435, the UE may refrain from monitoring the set of time-frequency resources based at least in part on the DLPI. The operations of 1435 may be performed according to the methods described herein. In some examples, aspects of the operations of 1435 may be performed by a monitoring component as described with reference to FIGS. 5 through 8.

At 1440, the UE may communicate with the base station using the remaining portion of the time-frequency resources. The operations of 1440 may be performed according to the methods described herein. In some examples, aspects of the operations of 1440 may be performed by a communications component as described with reference to FIGS. 5 through 8.

Figure 15:
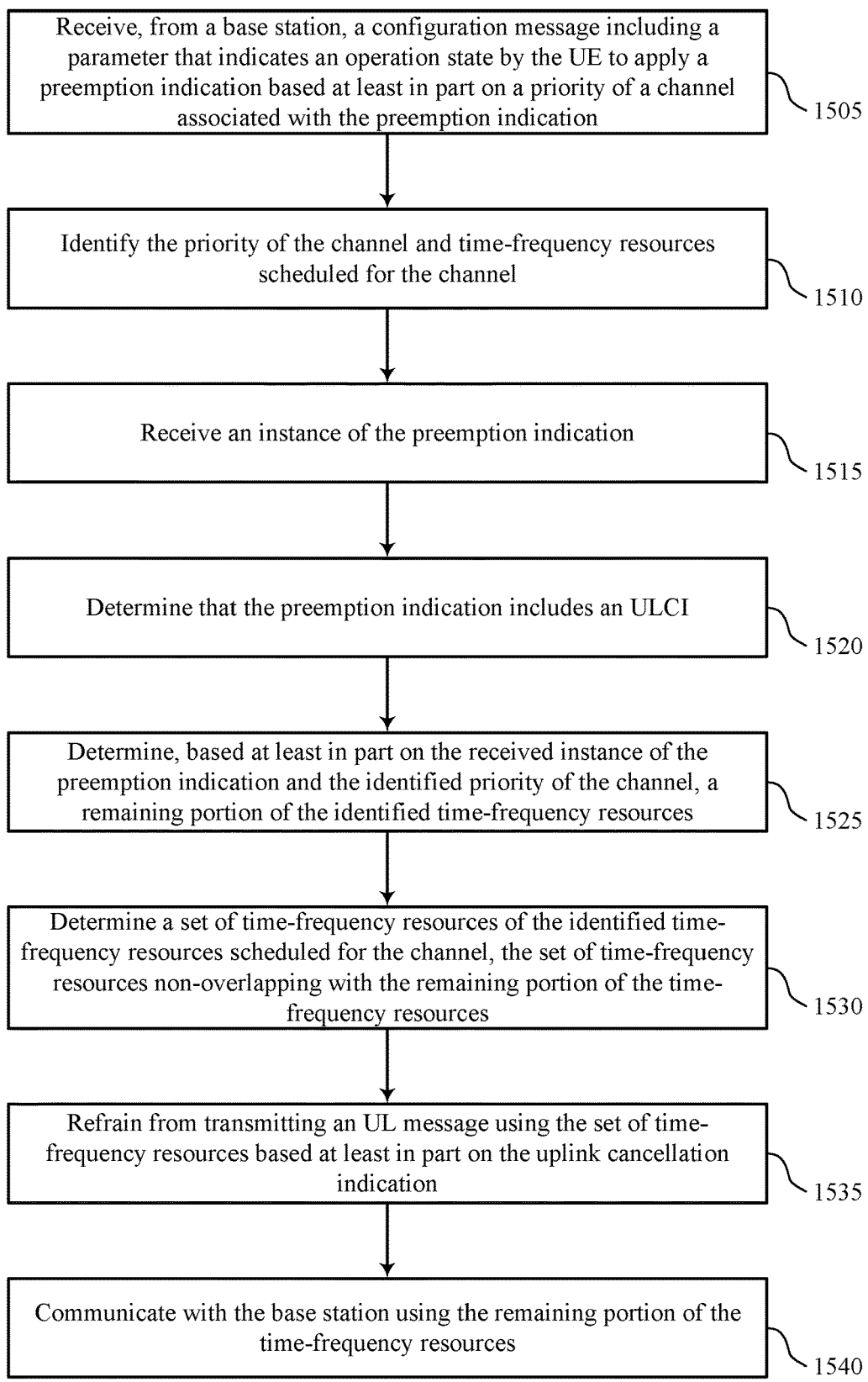

FIG. 15 shows a flowchart illustrating a method 1500 that supports priority indication for downlink preemption and uplink cancellation in accordance with aspects of the present disclosure. The operations of method 1500 may be implemented by a UE 115 or its components as described herein. For example, the operations of method 1500 may be performed by a preemption manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a configuration message including a parameter that indicates an operation state by the UE to apply a preemption indication (e.g., DLPI or ULCI) based at least in part on a priority of a channel associated with the preemption indication. The operations of 1505 may be performed according to the methods described herein. In some examples, aspects of the operations of 1505 may be performed by an operation state component as described with reference to FIGS. 5 through 8.

At 1510, the UE may identify the priority of the channel and time-frequency resources scheduled for the channel. The operations of 1510 may be performed according to the methods described herein. In some examples, aspects of the operations of 1510 may be performed by a channel manager as described with reference to FIGS. 5 through 8.

At 1515, the UE may receive an instance of the preemption indication. The operations of 1515 may be performed according to the methods described herein. In some examples, aspects of the operations of 1515 may be performed by a preemption indication component as described with reference to FIGS. 5 through 8.

At 1520, the UE may determine that the preemption indication includes an ULCI. The operations of 1520 may be performed according to the methods described herein. In some examples, aspects of the operations of 1520 may be performed by a preemption indication component as described with reference to FIGS. 5 through 8.

At 1525, the UE may determine, based at least in part on the received instance of the preemption indication and the identified priority of the channel, a remaining portion of the identified time-frequency resources. The operations of 1525 may be performed according to the methods described herein. In some examples, aspects of the operations of 1525 may be performed by a resources component as described with reference to FIGS. 5 through 8.

At 1530, the UE may determine a set of time-frequency resources of the identified time-frequency resources scheduled for the channel, the set of time-frequency resources non-overlapping with the remaining portion of the time-frequency resources. The operations of 1530 may be performed according to the methods described herein. In some examples, aspects of the operations of 1530 may be performed by a resources component as described with reference to FIGS. 5 through 8.

At 1535, the UE may refrain from transmitting an uplink message using the set of time-frequency resources based at least in part on the ULCI. The operations of 1535 may be performed according to the methods described herein. In some examples, aspects of the operations of 1535 may be performed by a transmitting component as described with reference to FIGS. 5 through 8.

At 1540, the UE may communicate with the base station using the remaining portion of the time-frequency resources. The operations of 1540 may be performed according to the methods described herein. In some examples, aspects of the operations of 1540 may be performed by a communications component as described with reference to FIGS. 5 through 8.

Figure 16:
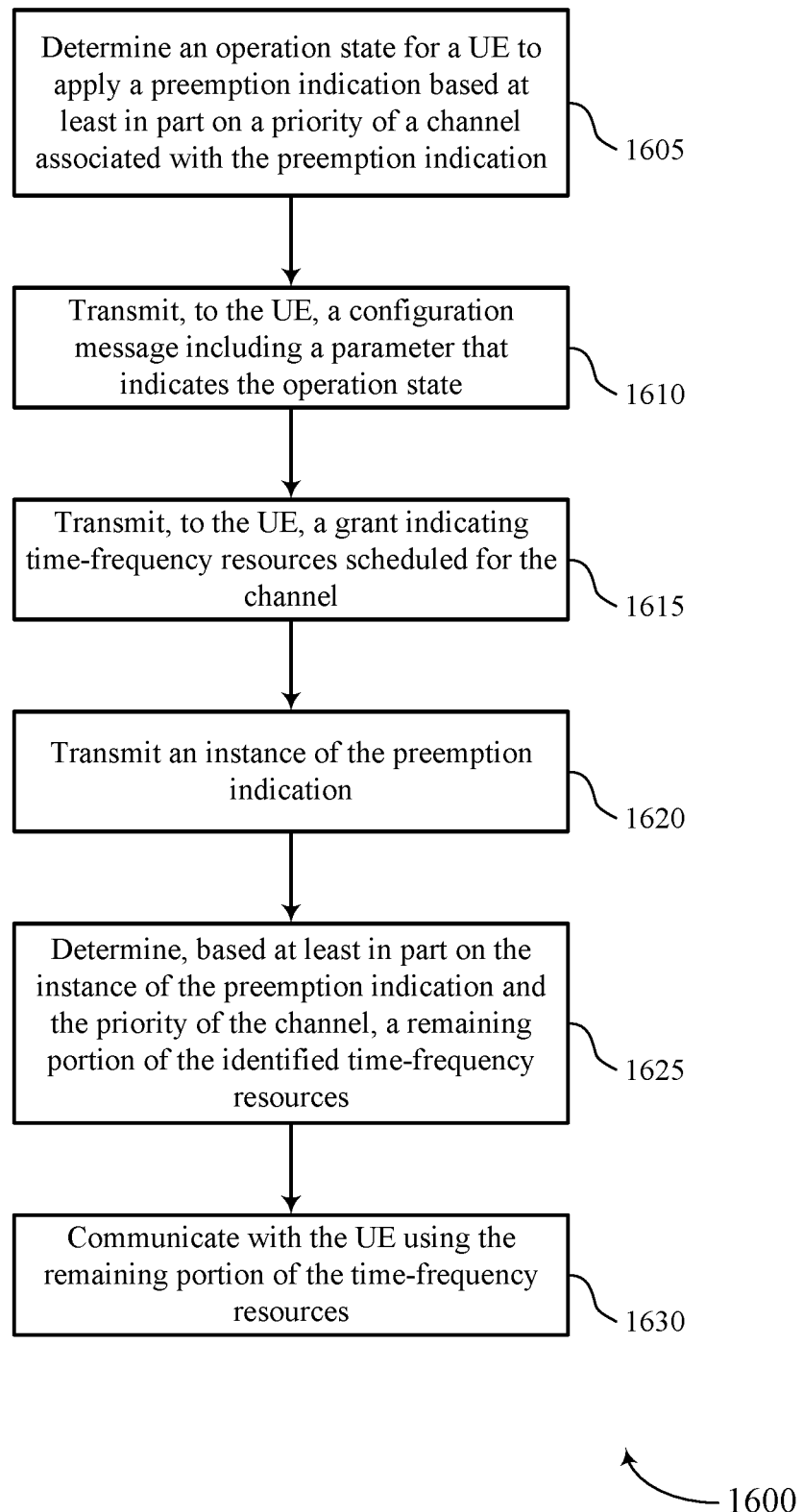

FIG. 16 shows a flowchart illustrating a method 1600 that supports priority indication for downlink preemption and uplink cancellation in accordance with aspects of the present disclosure. The operations of method 1600 may be implemented by a base station 105 or its components as described herein. For example, the operations of method 1600 may be performed by a preemption manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may determine an operation state for a UE to apply a preemption indication (e.g., DLPI or ULCI) based at least in part on a priority of a channel associated with the preemption indication. The operations of 1605 may be performed according to the methods described herein. In some examples, aspects of the operations of 1605 may be performed by an operation state manager as described with reference to FIGS. 9 through 12.

At 1610, the base station may transmit, to the UE, a configuration message including a parameter that indicates the operation state. The operations of 1610 may be performed according to the methods described herein. In some examples, aspects of the operations of 1610 may be performed by a configuration transmitter as described with reference to FIGS. 9 through 12.

At 1615, the base station may transmit, to the UE, a grant indicating time-frequency resources scheduled for the channel. The operations of 1615 may be performed according to the methods described herein. In some examples, aspects of the operations of 1615 may be performed by a grant component as described with reference to FIGS. 9 through 12.

At 1620, the base station may transmit an instance of the preemption indication. The operations of 1620 may be performed according to the methods described herein. In some examples, aspects of the operations of 1620 may be performed by an indication transmitter as described with reference to FIGS. 9 through 12.

At 1625, the base station may determine, based at least in part on the instance of the preemption indication and the priority of the channel, a remaining portion of the identified time-frequency resources. The operations of 1625 may be performed according to the methods described herein. In some examples, aspects of the operations of 1625 may be performed by a resource manager as described with reference to FIGS. 9 through 12.

At 1630, the base station may communicate with the UE using the remaining portion of the time-frequency resources. The operations of 1630 may be performed according to the methods described herein. In some examples, aspects of the operations of 1630 may be performed by a communications module as described with reference to FIGS. 9 through 12.

Figure 17:
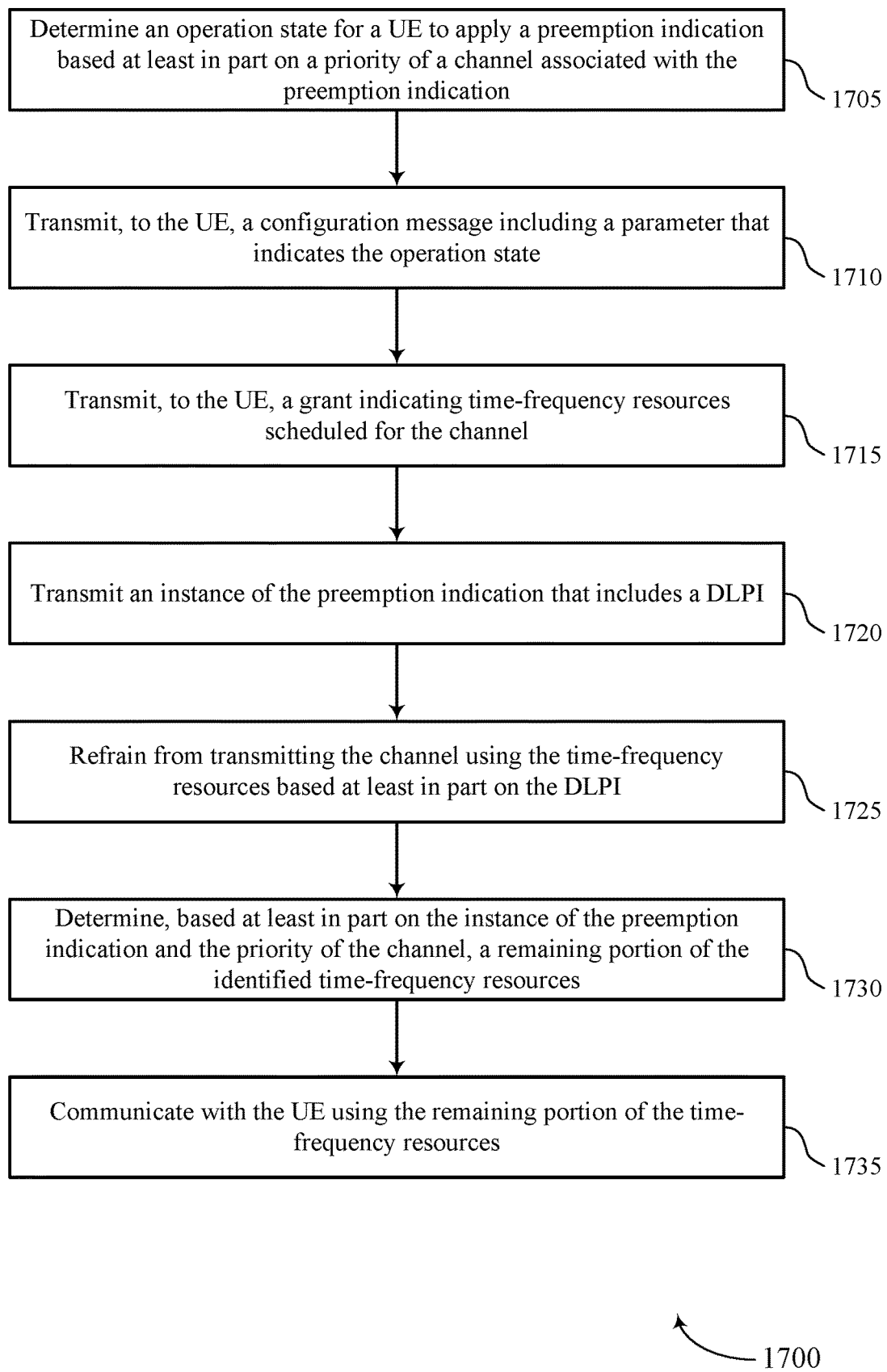

FIG. 17 shows a flowchart illustrating a method 1700 that supports priority indication for downlink preemption and uplink cancellation in accordance with aspects of the present disclosure. The operations of method 1700 may be implemented by a base station 105 or its components as described herein. For example, the operations of method 1700 may be performed by a preemption manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may determine an operation state for a UE to apply a preemption indication (e.g., DLPI or ULCI) based at least in part on a priority of a channel associated with the preemption indication. The operations of 1705 may be performed according to the methods described herein. In some examples, aspects of the operations of 1705 may be performed by an operation state manager as described with reference to FIGS. 9 through 12.

At 1710, the base station may transmit, to the UE, a configuration message including a parameter that indicates the operation state. The operations of 1710 may be performed according to the methods described herein. In some examples, aspects of the operations of 1710 may be performed by a configuration transmitter as described with reference to FIGS. 9 through 12.

At 1715, the base station may transmit, to the UE, a grant indicating time-frequency resources scheduled for the channel. The operations of 1715 may be performed according to the methods described herein. In some examples, aspects of the operations of 1715 may be performed by a grant component as described with reference to FIGS. 9 through 12.

At 1720, the base station may transmit an instance of the preemption indication that includes a DLPI. The operations of 1720 may be performed according to the methods described herein. In some examples, aspects of the operations of 1720 may be performed by an indication transmitter as described with reference to FIGS. 9 through 12.

At 1725, the base station may refrain from transmitting the channel using the time-frequency resources based at least in part on the DLPI. The operations of 1725 may be performed according to the methods described herein. In some examples, aspects of the operations of 1725 may be performed by a transmission manager as described with reference to FIGS. 9 through 12.

At 1730, the base station may determine, based at least in part on the instance of the preemption indication and the priority of the channel, a remaining portion of the identified time-frequency resources. The operations of 1730 may be performed according to the methods described herein. In some examples, aspects of the operations of 1730 may be performed by a resource manager as described with reference to FIGS. 9 through 12.

At 1735, the base station may communicate with the UE using the remaining portion of the time-frequency resources. The operations of 1735 may be performed according to the methods described herein. In some examples, aspects of the operations of 1735 may be performed by a communications module as described with reference to FIGS. 9 through 12.

Figure 18:
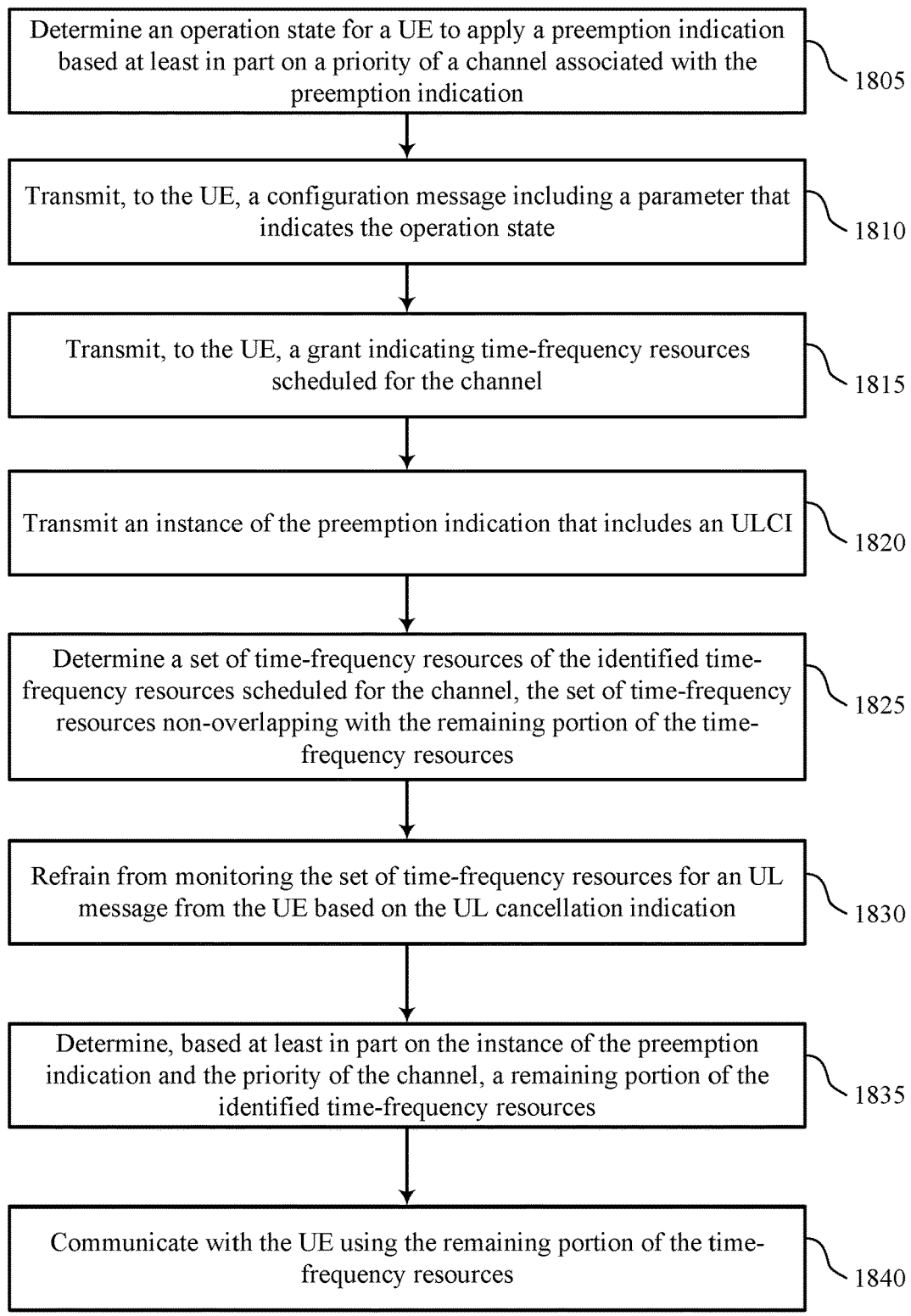

FIG. 18 shows a flowchart illustrating a method 1800 that supports priority indication for downlink preemption and uplink cancellation in accordance with aspects of the present disclosure. The operations of method 1800 may be implemented by a base station 105 or its components as described herein. For example, the operations of method 1800 may be performed by a preemption manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1805, the base station may determine an operation state for a UE to apply a preemption indication (e.g., DLPI or ULCI) based at least in part on a priority of a channel associated with the preemption indication. The operations of 1805 may be performed according to the methods described herein. In some examples, aspects of the operations of 1805 may be performed by an operation state manager as described with reference to FIGS. 9 through 12.

At 1810, the base station may transmit, to the UE, a configuration message including a parameter that indicates the operation state. The operations of 1810 may be performed according to the methods described herein. In some examples, aspects of the operations of 1810 may be performed by a configuration transmitter as described with reference to FIGS. 9 through 12.

At 1815, the base station may transmit, to the UE, a grant indicating time-frequency resources scheduled for the channel. The operations of 1815 may be performed according to the methods described herein. In some examples, aspects of the operations of 1815 may be performed by a grant component as described with reference to FIGS. 9 through 12.

At 1820, the base station may transmit an instance of the preemption indication that includes an ULCI. The operations of 1820 may be performed according to the methods described herein. In some examples, aspects of the operations of 1820 may be performed by an indication transmitter as described with reference to FIGS. 9 through 12.

At 1825, the base station may determine a set of time-frequency resources of the identified time-frequency resources scheduled for the channel, the set of time-frequency resources non-overlapping with the remaining portion of the time-frequency resources. The operations of 1825 may be performed according to the methods described herein. In some examples, aspects of the operations of 1825 may be performed by a resource manager as described with reference to FIGS. 9 through 12.

At 1830, the base station may refrain from monitoring the set of time-frequency resources for an uplink message from the UE based at least in part on the ULCI. The operations of 1830 may be performed according to the methods described herein. In some examples, aspects of the operations of 1830 may be performed by a message monitor as described with reference to FIGS. 9 through 12.

At 1835, the base station may determine, based at least in part on the instance of the preemption indication and the priority of the channel, a remaining portion of the identified time-frequency resources. The operations of 1835 may be performed according to the methods described herein. In some examples, aspects of the operations of 1835 may be performed by a resource manager as described with reference to FIGS. 9 through 12.

At 1840, the base station may communicate with the UE using the remaining portion of the time-frequency resources. The operations of 1840 may be performed according to the methods described herein. In some examples, aspects of the operations of 1840 may be performed by a communications module as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, a configuration message comprising a parameter that indicates an operation state by the UE to apply a preemption indication based at least in part on a priority of a channel associated with the preemption indication; identifying the priority of the channel and time-frequency resources scheduled for the channel; receiving an instance of the preemption indication; determining, based at least in part on the received instance of the preemption indication and the identified priority of the channel, a remaining portion of the identified time-frequency resources; and communicating with the base station using the remaining portion of the time-frequency resources.

Aspect 2: The method of aspect 1, wherein the preemption indication comprises an uplink cancellation indication.

Aspect 3: The method of aspect 2, further comprising: determining a set of time-frequency resources of the identified time-frequency resources scheduled for the channel, the set of time-frequency resources non-overlapping with the remaining portion of the time-frequency resources; and refraining from transmitting an uplink message using the set of time-frequency resources based at least in part on the uplink cancellation indication.

Aspect 4: The method of any of aspects 2 through 3, further comprising: determining a set of time-frequency resources scheduled for a second channel associated with a second priority different from the priority of the channel, the set of time-frequency resources non-overlapping with the remaining portion of the time-frequency resources; and transmitting the second channel using the set of time-frequency resources based at least in part on the operation state and the uplink cancellation indication being associated with the priority.

Aspect 5: The method of aspect 4, wherein the second channel is associated with a carrier different than the channel.

Aspect 6: The method of any of aspects 2 through 5, further comprising: receiving a message indicating a set of time-frequency resources for the uplink cancellation indication; and monitoring the set of time-frequency resources for the uplink cancellation indication, wherein receiving the instance of the preemption indication is based at least in part on the monitoring.

Aspect 7: The method of aspect 1, wherein the preemption indication comprises a downlink preemption indication.

Aspect 8: The method of aspect 7, further comprising: determining a set of time-frequency resources of the identified time-frequency resources scheduled for the channel, the set of time-frequency resources non-overlapping with the remaining portion of the time-frequency resources; and refraining from monitoring the set of time-frequency resources based at least in part on the downlink preemption indication.

Aspect 9: The method of any of aspects 7 through 8, further comprising: determining a set of time-frequency resources scheduled for a second channel associated with a second priority different from the priority of the channel, the set of time-frequency resources non-overlapping with the remaining portion of the time-frequency resources; and monitoring the set of time-frequency resources for the second channel based at least in part on the operation state and the downlink preemption indication being associated with the priority.

Aspect 10: The method of aspect 9, wherein the second channel is associated with a carrier different than the channel.

Aspect 11: The method of any of aspects 7 through 10, further comprising: receiving a message indicating a set of time-frequency resources for the downlink preemption indication; and monitoring the set of time-frequency resources for the downlink preemption indication, wherein receiving the instance of the preemption indication is based at least in part on the monitoring.

Aspect 12: The method of any of aspects 1 through 11, further comprising: configuring the UE to monitor for both a downlink preemption indication and an uplink cancellation indication.

Aspect 13: The method of aspect 12, wherein configuring the UE to monitor for both the downlink preemption indication and the uplink cancellation indication comprises: receiving a first message configuring the UE to monitor for the downlink preemption indication; and receiving a second message configuring the UE to monitor for the uplink cancellation indication.

Aspect 14: The method of any of aspects 1 through 13, further comprising: determining a plurality of channels including the channel in which the UE is to apply the preemption indication based at least in part on the operation state.

Aspect 15: The method of aspect 14, wherein the plurality of channels comprises at least two channels with different priorities.

Aspect 16: A method for wireless communications at a base station, comprising: determining an operation state for a UE to apply a preemption indication based at least in part on a priority of a channel associated with the preemption indication; transmitting, to the UE, a configuration message comprising a parameter that indicates the operation state; transmitting, to the UE, a grant indicating time-frequency resources scheduled for the channel; transmitting an instance of the preemption indication; determining, based at least in part on the instance of the preemption indication and the priority of the channel, a remaining portion of the identified time-frequency resources; and communicating with the UE using the remaining portion of the time-frequency resources.

Aspect 17: The method of aspect 16, wherein the preemption indication comprises an uplink cancellation indication.

Aspect 18: The method of aspect 17, further comprising: determining a set of time-frequency resources of the identified time-frequency resources scheduled for the channel, the set of time-frequency resources non-overlapping with the remaining portion of the time-frequency resources; and refraining from monitoring the set of time-frequency resources for an uplink message from the UE based at least in part on the uplink cancellation indication.

Aspect 19: The method of any of aspects 17 through 18, further comprising: determining a set of time-frequency resources for a second channel associated with a second priority different from the priority of the channel, the set of time-frequency resources non-overlapping with the remaining portion of the time-frequency resources; and monitoring the set of time-frequency resources for the second channel based at least in part on the operation state and the uplink cancellation indication being associated with the priority.

Aspect 20: The method of aspect 19, wherein the second channel is associated with a carrier different than the channel.

Aspect 21: The method of any of aspects 17 through 20, further comprising: transmitting a message indicating a set of time-frequency resources for the uplink cancellation indication; and transmitting the uplink cancellation indication using the set of time-frequency resources.

Aspect 22: The method of any of aspects 16, wherein the preemption indication comprises a downlink preemption indication.

Aspect 23: The method of aspect 22, further comprising: refraining from transmitting the channel using the time-frequency resources based at least in part on the downlink preemption indication.

Aspect 24: The method of any of aspects 22 through 23, further comprising: determining a set of time-frequency resources for a second channel associated with a second priority different from the priority of the channel, the set of time-frequency resources non-overlapping with the remaining portion of the time-frequency resources; and transmitting the second channel using the set of time-frequency resources based at least in part on the operation state and the downlink preemption indication being associated with the priority.

Aspect 25: The method of aspect 24, wherein the second channel is associated with a carrier different than the channel.

Aspect 26: The method of any of aspects 22 through 25, further comprising: transmitting a message indicating a set of time-frequency resources for the downlink preemption indication; and transmitting the downlink preemption indication using the set of time-frequency resources.

Aspect 27: The method of any of aspects 16 through 26, further comprising: configuring the UE to monitor for both a downlink preemption indication and an uplink cancellation indication.

Aspect 28: The method of aspect 27, wherein configuring the UE to monitor for both the downlink preemption indication and the uplink cancellation indication comprises: transmitting a first message configuring the UE to monitor for the downlink preemption indication; and transmitting a second message configuring the UE to monitor for the uplink cancellation indication.

Aspect 29: An apparatus for wireless communications at a UE, comprising a processor; memory coupled with the processor; and instructions stored in the memory and executable by the processor to cause the apparatus to perform a method of any of aspects 1 through 15.

Aspect 30: An apparatus for wireless communications at a UE, comprising at least one means for performing a method of any of aspects 1 through 15.

Aspect 31: A non-transitory computer-readable medium storing code for wireless communications at a UE, the code comprising instructions executable by a processor to perform a method of any of aspects 1 through 15.

Aspect 32: An apparatus for wireless communications at a base station, comprising a processor; memory coupled with the processor; and instructions stored in the memory and executable by the processor to cause the apparatus to perform a method of any of aspects 16 through 28.

Aspect 33: An apparatus for wireless communications at a base station, comprising at least one means for performing a method of any of aspects 16 through 28.

Aspect 34: A non-transitory computer-readable medium storing code for wireless communications at a base station, the code comprising instructions executable by a processor to perform a method of any of aspects 16 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a configuration message comprising a parameter that indicates an operation state of the UE in which to apply a preemption indication to a set of time-frequency resources of a plurality of time-frequency resources scheduled for communications based at least in part on a priority of a channel associated with the preemption indication;
   receiving an instance of the preemption indication; and
   applying, in accordance with the operation state, the preemption indication to the set of time-frequency resources based at least in part on the priority of the channel, wherein a remaining portion of the plurality of time-frequency resources is useable for communication by the UE via at least one channel, the remaining portion of the plurality of time-frequency resources being different than the set of time-frequency resources.

2. The method of claim 1, wherein the preemption indication comprises an uplink cancellation indication.

3. The method of claim 2, further comprising:
   determining the set of time-frequency resources of the plurality of time-frequency resources scheduled for the channel, the set of time-frequency resources non-overlapping with the remaining portion of the plurality of time-frequency resources; and
   refraining from transmitting an uplink message using the set of time-frequency resources based at least in part on the uplink cancellation indication.

4. The method of claim 2, further comprising:
   determining a second set of time-frequency resources scheduled for a second channel associated with a second priority different from the priority of the channel, the second set of time-frequency resources non-overlapping with the remaining portion of the plurality of time-frequency resources; and
   transmitting the second channel using the second set of time-frequency resources based at least in part on the operation state and the uplink cancellation indication being associated with the priority.

5. The method of claim 2, further comprising:
   receiving a message indicating the set of time-frequency resources for the uplink cancellation indication; and
   monitoring the set of time-frequency resources for the uplink cancellation indication, wherein receiving the instance of the preemption indication is based at least in part on the monitoring.

6. The method of claim 1, wherein the preemption indication comprises a downlink preemption indication.

7. The method of claim 6, further comprising:
   determining the set of time-frequency resources of the plurality of time-frequency resources scheduled for the channel, the set of time-frequency resources non-overlapping with the remaining portion of the plurality of time-frequency resources; and
   refraining from monitoring the set of time-frequency resources based at least in part on the downlink preemption indication.

8. The method of claim 6, further comprising:
   determining a second set of time-frequency resources scheduled for a second channel associated with a second priority different from the priority of the channel, the second set of time-frequency resources non-overlapping with the remaining portion of the plurality of time-frequency resources; and
   monitoring the second set of time-frequency resources for the second channel based at least in part on the operation state and the downlink preemption indication being associated with the priority.

9. The method of claim 6, further comprising:
   receiving a message indicating the set of time-frequency resources for the downlink preemption indication; and
   monitoring the set of time-frequency resources for the downlink preemption indication, wherein receiving the instance of the preemption indication is based at least in part on the monitoring.

10. The method of claim 1, further comprising:
    configuring the UE to monitor for both a downlink preemption indication and an uplink cancellation indication.

11. The method of claim 10, wherein configuring the UE to monitor for both the downlink preemption indication and the uplink cancellation indication comprises:
    receiving a first message configuring the UE to monitor for the downlink preemption indication; and
    receiving a second message configuring the UE to monitor for the uplink cancellation indication.

12. The method of claim 1, further comprising:
    determining a plurality of channels including the channel in which the UE is to apply the preemption indication based at least in part on the operation state.

13. A method for wireless communications at a network device, comprising:
    transmitting, to a user equipment (UE), a configuration message comprising a parameter that indicates an operation state of the UE in which to apply a preemption indication to a set of time-frequency resources of a plurality of time-frequency resources scheduled for communications based at least in part on a priority of a channel associated with the preemption indication;
    transmitting, to the UE, a grant indicating the set of time-frequency resources scheduled for the channel; and
    transmitting an instance of the preemption indication, wherein a remaining portion of the plurality of time-frequency resources is useable for communication by the network device via at least one channel, the remaining portion of the plurality of time-frequency resources being different than the set of time-frequency resources.

14. The method of claim 13, wherein the preemption indication comprises an uplink cancellation indication.

15. The method of claim 14, further comprising:
determining the set of time-frequency resources of the plurality of time-frequency resources scheduled for the channel, the set of time-frequency resources non-overlapping with the remaining portion of the plurality of time-frequency resources; and
refraining from monitoring the set of time-frequency resources for an uplink message from the UE based at least in part on the uplink cancellation indication.

16. The method of claim 14, further comprising:
determining a second set of time-frequency resources for a second channel associated with a second priority different from the priority of the channel, the second set of time-frequency resources non-overlapping with the remaining portion of the plurality of time-frequency resources; and
monitoring the second set of time-frequency resources for the second channel based at least in part on the operation state and the uplink cancellation indication being associated with the priority.

17. The method of claim 14, further comprising:
transmitting a message indicating the set of time-frequency resources for the uplink cancellation indication; and
transmitting the uplink cancellation indication using the set of time-frequency resources.

18. The method of claim 13, wherein the preemption indication comprises a downlink preemption indication.

19. The method of claim 18, further comprising:
refraining from transmitting the channel using the set of time-frequency resources based at least in part on the downlink preemption indication.

20. The method of claim 18, further comprising:
determining a second set of time-frequency resources for a second channel associated with a second priority different from the priority of the channel, the second set of time-frequency resources non-overlapping with the remaining portion of the plurality of time-frequency resources; and
transmitting the second channel using the second set of time-frequency resources based at least in part on the operation state and the downlink preemption indication being associated with the priority.

21. The method of claim 18, further comprising:
transmitting a message indicating the set of time-frequency resources for the downlink preemption indication; and
transmitting the downlink preemption indication using the set of time-frequency resources.

22. The method of claim 13, further comprising:
configuring the UE to monitor for both a downlink preemption indication and an uplink cancellation indication.

23. The method of claim 22, wherein configuring the UE to monitor for both the downlink preemption indication and the uplink cancellation indication comprises:
transmitting a first message configuring the UE to monitor for the downlink preemption indication; and
transmitting a second message configuring the UE to monitor for the uplink cancellation indication.

24. An apparatus for wireless communications at a user equipment (UE), comprising:
a processor; and
a memory coupled with the processor, wherein the memory comprises instructions executable by the processor to cause the apparatus to:
receive a configuration message comprising a parameter that indicates an operation state of the UE in which to apply a preemption indication to a set of time-frequency resources of a plurality of time-frequency resources scheduled for communications based at least in part on a priority of a channel associated with the preemption indication;
receive an instance of the preemption indication; and
apply, in accordance with the operation state, the preemption indication to the set of time-frequency resources based at least in part on the priority of the channel, wherein a remaining portion of the plurality of time-frequency resources is useable for communication by the UE via at least one channel, the remaining portion of the plurality of time-frequency resources being different than the set of time-frequency resources.

25. The apparatus of claim 24, wherein the preemption indication comprises an uplink cancellation indication.

26. The apparatus of claim 25, wherein the instructions are further executable by the processor to cause the apparatus to:
determine the set of time-frequency resources of the plurality of time-frequency resources scheduled for the channel, the set of time-frequency resources non-overlapping with the remaining portion of the plurality of time-frequency resources; and
refrain from transmitting an uplink message using the set of time-frequency resources based at least in part on the uplink cancellation indication.

27. The apparatus of claim 25, wherein the instructions are further executable by the processor to cause the apparatus to:
determine a second set of time-frequency resources scheduled for a second channel associated with a second priority different from the priority of the channel, the second set of time-frequency resources non-overlapping with the remaining portion of the plurality of time-frequency resources; and
transmit the second channel using the second set of time-frequency resources based at least in part on the operation state and the uplink cancellation indication being associated with the priority.

28. The apparatus of claim 25, wherein the instructions are further executable by the processor to cause the apparatus to:
receive a message indicating the set of time-frequency resources for the uplink cancellation indication; and
monitor the set of time-frequency resources for the uplink cancellation indication, wherein receiving the instance of the preemption indication is based at least in part on the monitoring.

29. The apparatus of claim 24, wherein the preemption indication comprises a downlink preemption indication.

30. The apparatus of claim 29, wherein the instructions are further executable by the processor to cause the apparatus to:
determine the set of time-frequency resources of the plurality of time-frequency resources scheduled for the channel, the set of time-frequency resources non-overlapping with the remaining portion of the plurality of time-frequency resources; and refrain from monitoring the set of time-frequency resources based at least in part on the downlink preemption indication.

31. The apparatus of claim 29, wherein the instructions are further executable by the processor to cause the apparatus to:
determine a second set of time-frequency resources scheduled for a second channel associated with a second priority different from the priority of the channel, the second set of time-frequency resources non-overlapping with the remaining portion of the plurality of time-frequency resources; and
monitor the second set of time-frequency resources for the second channel based at least in part on the operation state and the downlink preemption indication being associated with the priority.

32. The apparatus of claim 29, wherein the instructions are further executable by the processor to cause the apparatus to:
receive a message indicating the set of time-frequency resources for the downlink preemption indication; and
monitor the set of time-frequency resources for the downlink preemption indication, wherein receiving the instance of the preemption indication is based at least in part on the monitoring.

33. The apparatus of claim 24, wherein the instructions are further executable by the processor to cause the apparatus to:
configure the UE to monitor for both a downlink preemption indication and an uplink cancellation indication.

34. The apparatus of claim 24, wherein the instructions are further executable by the processor to cause the apparatus to:
determine a plurality of channels including the channel in which the UE is to apply the preemption indication based at least in part on the operation state.

35. An apparatus for wireless communications at a network device, comprising:
a processor; and
a memory coupled with the processor, wherein the memory comprises instructions executable by the processor to cause the apparatus to:
transmit, to a user equipment (UE), a configuration message comprising a parameter that indicates an operation state of the UE in which to apply a preemption indication to a set of time-frequency resources of a plurality of time-frequency resources scheduled for communications based at least in part on a priority of a channel associated with the preemption indication;
transmit, to the UE, a grant indicating the set of time-frequency resources scheduled for the channel; and
transmit an instance of the preemption indication, wherein a remaining portion of the plurality of time-frequency resources is useable for communication by the network device via at least one channel, the remaining portion of the plurality of time-frequency resources being different than the set of time-frequency resources.

36. The apparatus of claim 35, wherein the preemption indication comprises an uplink cancellation indication.

37. The apparatus of claim 36, wherein the instructions are further executable by the processor to cause the apparatus to:
determine the set of time-frequency resources of the plurality of time-frequency resources scheduled for the channel, the set of time-frequency resources non-overlapping with the remaining portion of the plurality of time-frequency resources; and
refrain from monitoring the set of time-frequency resources for an uplink message from the UE based at least in part on the uplink cancellation indication.

38. The apparatus of claim 36, wherein the instructions are further executable by the processor to cause the apparatus to:
determine a second set of time-frequency resources for a second channel associated with a second priority different from the priority of the channel, the second set of time-frequency resources non-overlapping with the remaining portion of the plurality of time-frequency resources; and
monitor the second set of time-frequency resources for the second channel based at least in part on the operation state and the uplink cancellation indication being associated with the priority.

39. The apparatus of claim 36, wherein the instructions are further executable by the processor to cause the apparatus to:
transmit a message indicating the set of time-frequency resources for the uplink cancellation indication; and
transmit the uplink cancellation indication using the set of time-frequency resources.

40. The apparatus of claim 35, wherein the preemption indication comprises a downlink preemption indication.

41. The apparatus of claim 40, wherein the instructions are further executable by the processor to cause the apparatus to:
refrain from transmitting the channel using the set of time-frequency resources based at least in part on the downlink preemption indication.

42. The apparatus of claim 40, wherein the instructions are further executable by the processor to cause the apparatus to:
determine a second set of time-frequency resources for a second channel associated with a second priority different from the priority of the channel, the second set of time-frequency resources non-overlapping with the remaining portion of the plurality of time-frequency resources; and
transmit the second channel using the second set of time-frequency resources based at least in part on the operation state and the downlink preemption indication being associated with the priority.

43. The apparatus of claim 40, wherein the instructions are further executable by the processor to cause the apparatus to:
transmit a message indicating the set of time-frequency resources for the downlink preemption indication; and
transmit the downlink preemption indication using the set of time-frequency resources.

44. The apparatus of claim 35, wherein the instructions are further executable by the processor to cause the apparatus to:
configure the UE to monitor for both a downlink preemption indication and an uplink cancellation indication.

* * * * *